(12) United States Patent
Kurokawa et al.

(10) Patent No.: US 8,958,278 B2
(45) Date of Patent: Feb. 17, 2015

(54) OPTICAL INFORMATION REPRODUCTION APPARATUS USING HOMODYNE PHASE DIVERSITY DETECTION WITH IMPROVED SNR

(71) Applicant: Hitachi Consumer Electronics Co., Ltd., Tokyo (JP)

(72) Inventors: Takahiro Kurokawa, Yokohama (JP); Atsushi Kikugawa, Hiratsuka (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/875,350

(22) Filed: May 2, 2013

(65) Prior Publication Data
US 2014/0029405 A1    Jan. 30, 2014

(30) Foreign Application Priority Data
Jul. 30, 2012   (JP) .................... 2012-167926

(51) Int. Cl.
*G11B 20/10* (2006.01)
*G11B 7/005* (2006.01)

(52) U.S. Cl.
CPC .......... *G11B 20/10481* (2013.01); *G11B 7/005* (2013.01)
USPC ........................................... 369/107

(58) Field of Classification Search
None
See application file for complete search history.

(56) References Cited

U.S. PATENT DOCUMENTS

| | | | |
|---|---|---|---|
| 7,750,276 B2 | 7/2010 | Miyamoto et al. | |
| 8,023,390 B2 * | 9/2011 | Shimano et al. | 369/112.16 |
| 2005/0226108 A1 * | 10/2005 | Ichimura | 369/44.28 |
| 2005/0259551 A1 * | 11/2005 | Kudo et al. | 369/59.22 |
| 2009/0073850 A1 * | 3/2009 | Ide et al. | 369/103 |
| 2009/0316539 A1 * | 12/2009 | Mikami et al. | 369/44.32 |
| 2010/0039917 A1 * | 2/2010 | Ide | 369/100 |
| 2011/0080815 A1 * | 4/2011 | Mikami et al. | 369/47.19 |
| 2011/0235485 A1 * | 9/2011 | Mikami | 369/44.37 |
| 2012/0213046 A1 * | 8/2012 | Yamazaki | 369/44.32 |
| 2012/0223847 A1 * | 9/2012 | Mazumdar et al. | 341/100 |

FOREIGN PATENT DOCUMENTS

JP    2010-170616 A    8/2010

* cited by examiner

*Primary Examiner* — Brenda Bernardi
(74) *Attorney, Agent, or Firm* — Mattingly & Malur, PC

(57) ABSTRACT

In the optical information reproduction apparatus using Homodyne phase diversity detection, the S/N ratio of a reproduced signal is deteriorated due to the influence of a quantization noise generated in an A/D converter for digitalizing a differential signal. The optical information reproduction apparatus is arranged to have the A/D converter for digitalizing the differential signal having a vertical resolution equal to or higher than 9 bits.

13 Claims, 17 Drawing Sheets

PRIOR ART

PRIOR ART

PRIOR ART

PRIOR ART

PRIOR ART

OPTICAL INFORMATION REPRODUCTION APPARATUS USING HOMODYNE PHASE DIVERSITY DETECTION WITH IMPROVED SNR

CLAIM OF PRIORITY

The present application claims priority from Japanese patent application JP 2012-167926 filed on Jul. 30, 2012, the content of which is hereby incorporated by reference into this application.

BACKGROUND OF THE INVENTION

1. Field of the Invention

The present invention relates to an S/N ratio improvement technology of a reproduced signal in an optical disc reproduction apparatus.

2. Description of the Related Art

The recording capacity of an optical disc has been improved from the Compact Disc (CD) up to the Blu-ray Disc™ (BD) through the Digital Versatile Disc (DVD) due to miniaturization of the optical spot achieved by decrease in the wavelength of the light source and increase in the numerical aperture of the objective lens. However, since the optical spot size has nearly reached a limit in the BD using the blue light source and the high numerical aperture objective lens, a multilayer structure for increasing the number of recording layers for recording the information is one of the dominant measures to further increase the recording capacity. When realizing the multilayer recording layer, since the larger the number of recording layers becomes, the lower the intensity of the reflected light returning to the optical pickup becomes, the influence of the detection system noise such as amplifier noise increases, and the signal-to-noise ratio (S/N ratio) of the reproduced signal drops. Further, due to increase in the recording capacity, increase in the data transfer rate is also required. When increasing the data transfer rate, due to increase in the detection system noise caused by broadening the bandwidth of the reproduced signal, the S/N ratio of the reproduced signal drops. As described above, since the multilayer structure and the increase in the data transfer rate cause the drop of the S/N ratio, it is obvious that it becomes difficult to keep the reliability of the data with the reproduction method in the related art. Therefore, an S/N ratio improvement technology of the reproduced signal becomes important for the future improvement of the performance of optical discs.

As the S/N ratio improvement technology of the reproduced signal in the optical disc, an optical information detection method using Homodyne phase diversity detection is described in U.S. Pat. No. 7,750,276 (Document 1), for example. Specifically, by making the signal light reflected by the optical disc and the reference light branched from the same light source and guided to the detector without being reflected by the optical disc interfere with each other on the detector, an amplified reproduced signal is obtained. On this occasion, by simultaneously obtaining the detector outputs in four types of interference states with the phase relationships between the reference light and the signal light shifted 90 degrees from each other and then performing calculation, a stable reproduced signal can be obtained without being affected by the light path length variation due to flapping of the disc. According to this method, since the amplitude of the reproduced signal is amplified without increasing the amplifier noise, the S/N ratio is improved. Further, in JP-A-2010-170616 (Document 2), there is described an optical information reproduction method of monitoring the calculation process, the calculation output, or both of the calculation process and the calculation output in the Homodyne phase diversity detection, and disposing a calculation control mechanism for controlling the calculation so that the output is stabilized to thereby avoid the influence of the variation of the constituent components, the aging variation of the characteristics, and so on, and stably obtain the amplification effect.

Here, a related art detection method (hereinafter referred to as a normal detection method) not using the Homodyne phase diversity detection will be explained. The light emitted from a laser diode of a light source is collected by an objective lens, and the optical disc is irradiated with the light. The reflected light (hereinafter referred to as a signal light) from the optical disc is detected by a detector, and a reproduced signal is generated. The reproduced signal is sampled by an analog/digital converter (A/D converter) to thereby be digitalized, and the subsequent process is performed using digital calculation. An equalization process, a demodulation process, and a decoding process are performed on the reproduced signal thus digitalized to thereby restore user data.

There are several conversion methods used in the A/D converters, and FIG. 14 shows a configuration of a flash type as an example. In this method, an input voltage and voltage values obtained by dividing the reference voltage with resistors are compared with each other using $2^n-1$ voltage comparators, and the result is encoded into a binary number using an encoder, and thus, an n-bit digital value can be obtained. The number n of bits of the digital value represents the vertical resolution of the A/D converter. In the case in which the vertical resolution is n bits, the number of signal levels after the digitalization is $2^n$.

In the A/D converter, the quantization noise is caused by the error due to the conversion of an analog value into a digital value. The influence thereof becomes nonnegligible in the case in which the vertical resolution decreases, and thus, the S/N ratio of the reproduced signal is deteriorated. However, since the improvement of the vertical resolution is associated with increase in circuit size of the A/D converter and decrease in operation speed thereof, the vertical resolution is determined to be a level necessary and sufficient to make the influence of the quantization noise negligible. In the optical disc reproduction apparatus of the normal detection type of the related art, the vertical resolution of the A/D converter is typically determined to be 7 through 8 bits.

In contrast, in the case of the optical disc reproduction apparatus using the Homodyne phase diversity detection described in Document 1, the output signals $I_{PD1}$, $I_{PD2}$, $I_{PD3}$, and $I_{PD4}$ of four photodetectors PD1, PD2, PD3, and PD4 corresponding to the four types of interference states having the phase relationships between the signal light and the reference light 90 degrees different from each other are as follows.

$$I_{PD1} = \left|\frac{1}{2}E_{sig} + \frac{1}{2}E_{ref}\right|^2 = \frac{1}{4}|E_{sig}|^2 + \frac{1}{4}|E_{ref}|^2 + \frac{1}{2}|E_{sig}||E_{ref}|\cos(\varphi_{sig} - \varphi_{ref}) \quad (1)$$

$$I_{PD2} = \left|\frac{1}{2}E_{sig} - \frac{1}{2}E_{ref}\right|^2 = \frac{1}{4}|E_{sig}|^2 + \frac{1}{4}|E_{ref}|^2 - \frac{1}{2}|E_{sig}||E_{ref}|\cos(\varphi_{sig} - \varphi_{ref}) \quad (2)$$

-continued $$I_{PD3} = \frac{1}{8}|(1-i)E_{sig} + (1+i)E_{ref}|^2 = \quad (3)$$

$$\frac{1}{4}|E_{sig}|^2 + \frac{1}{4}|E_{ref}|^2 + \frac{1}{2}|E_{sig}||E_{ref}|\sin(\varphi_{sig} - \varphi_{ref})$$

$$I_{PD4} = \frac{1}{8}|(1+i)E_{sig} + (1-i)E_{ref}|^2 = \quad (4)$$

$$\frac{1}{4}|E_{sig}|^2 + \frac{1}{4}|E_{ref}|^2 - \frac{1}{2}|E_{sig}||E_{ref}|\sin(\varphi_{sig} - \varphi_{ref})$$

Here, $E_{sig}$ denotes the amplitude of the signal light, $E_{ref}$ denotes the amplitude of the reference light, $\phi_{sig}$ denotes the phase of the signal light, and $\phi_{ref}$ denotes the phase of the reference light. For the sake of simplicity, it is assumed that $E_{sig}$ and $E_{ref}$ are perfectly coherent with each other. Differential signals are obtained for each of the pairs of the signals $I_{PD1}$ and $I_{PD2}$, and $I_{PD3}$ and $I_{PD4}$, and the two differential signals Sig1 and Sig2 are expressed as follows.

$$\text{Sig1} = I_{PD1} - I_{PD2} = |E_{sig}||E_{ref}|\cos(\phi_{sig} - \phi_{ref}) \quad (5)$$

$$\text{Sig2} = I_{PD3} - I_{PD4} = |E_{sig}||E_{ref}|\sin(\phi_{sig} - \phi_{ref}) \quad (6)$$

According to the formulas (5) and (6), Sig1 and Sig2 each have the envelope of the waveform varying in accordance with the variation of the phase difference ($\phi_{sig} - \phi_{ref}$) between the signal light and the reference light. The variation of the phase difference is caused by the variation of the light path length of the signal light due to, for example, flapping of the disc.

Sig1 and Sig2 are respectively digitalized by the A/D converters, and then added to each other after being respectively squared to thereby form the reproduced signal S, which is proportional to the intensity $|E_{sig}|^2$ of the signal light independently of the phase difference ($\phi_{sig} - \phi_{ref}$), as expressed in the formula (7). Subsequently, by substantially the same process as in the case of the normal detection method, the recorded data is restored.

$$S = (\text{Sig1})^2 + (\text{Sig2})^2 = |E_{sig}|^2 |E_{ref}|^2 \quad (7)$$

Hereinafter, a problem in putting the optical disc reproduction apparatus using the Homodyne phase diversity detection into practical use will be described.

FIG. 1 is a graph obtained by calculating and then plotting the waveform of the reproduced signal in the normal detection using a diffractive optical simulator. The horizontal axis represents time (the unit is a channel bit period T), and the vertical axis represents signal intensity (arbitrary unit). As the calculation condition, the wavelength of the light source is set to 405 nm, and the numerical aperture (NA) of the objective lens is set to 0.85. It is assumed that a random pattern is used as the recorded data, and the channel bit length is set to 74.5 nm. It should be noted that any noise such as the medium noise or the amplifier noise is not added at all to the signal. The reference symbols $I_H$ and $I_L$ shown in the drawing respectively indicate an upper envelope level and a lower envelope level of the reproduced signal. The modulation m of the reproduced signal is defined as a value obtained by dividing the total amplitude of the reproduced signal by the upper envelope level, namely $m = (I_H - I_L)/I_H$, and m=0.4 is obtained in the waveform shown in the drawing.

FIG. 3A is a graph obtained by calculating and then plotting the relationship between the vertical resolution and the jitter of the A/D converter with respect to the reproduced signal shown in FIG. 1. This graph is obtained by digitalizing the waveform of the reproduced signal shown in FIG. 1 at a variety of levels of the vertical resolution, then performing, for example, the equalization process on the waveform, and then measuring the Data-to-Clock jitter. According to FIG. 3A, the lower the vertical resolution becomes, the higher the level of the jitter becomes, which shows the fact that the influence of the quantization noise is increased due to the insufficient vertical resolution. FIG. 3B is a graph obtained by plotting the relationship between the vertical resolution and the increment of the jitter due to the quantization noise, the relationship being obtained from the result of FIG. 3A. Here, the increment $\Delta\sigma$ of the jitter due to the quantization noise can be calculated as $\Delta\sigma = \sqrt{(\sigma^2 - \sigma_0^2)}$ denoting the jitter value at each of the vertical resolution levels with $\sigma$, and the jitter value at a sufficiently high vertical resolution level (8 bits here) with $\sigma_0$. As a rough criteria of the level of the jitter increment, if $\Delta\sigma$ exceeds about 3%, the influence of the quantization noise becomes nonnegligible on an empirical basis. Therefore, according to FIG. 3B, in the case of the normal detection method of the related art, if the vertical resolution becomes equal to or lower than 5 bits, the S/N ratio of the reproduced signal is deteriorated due to the influence of the quantization noise. In the actual reproduction apparatus, the vertical resolution is generally set to 7 or 8 bits taking the amplitude margin of the input signal to the A/D converter into consideration.

Then, FIG. 2 shows the waveforms of the differential signals Sig1 and Sig2 in the case of performing the Homodyne phase diversity detection in the condition in which the waveform of the reproduced signal in the normal detection shown in FIG. 1 is obtained. These waveforms are calculated using the formulas (5) and (6) assuming that the reproduced signal due to the normal detection is $|E_{sig}|^2$. It is assumed that the intensity $|E_{ref}|^2$ of the reference light is 100 times as high as the intensity $|E_{sig}|^2$ of the signal light. In the calculation, the disc flapping is virtually provided by varying the phase difference ($\phi_{sig} - \phi_{ref}$) between the signal light and the reference light in a range of 0 through $2\pi$ at a constant variation (period of about 14,000 T). According to FIG. 2, in Sig1 and Sig2, the envelopes of the waveform vary in accordance with the variation of the phase difference ($\phi_{sig} - \phi_{ref}$). The outer envelope and the inner envelope of the waveform thus varying correspond respectively to the upper envelope and the lower envelope of the reproduced signal due to the normal detection. In other words, the amplitude of the reproduced signal component in the differential signal corresponds to the thickness of the curve representing the differential signal waveform.

FIG. 17A is a graph showing the relationship between the vertical resolution and the jitter of the A/D converter in the case of performing the Homodyne phase diversity detection on the two differential signals shown in FIG. 2. This graph is obtained by digitalizing the two differential signals shown in FIG. 2 at a variety of levels of the vertical resolution, generating the reproduced signal by performing square sum calculation on the two differential signals thus digitalized, then performing, for example, the equalization process thereon, and then measuring the Data-to-Clock jitter. According to FIG. 17A, in the case of the Homodyne phase diversity detection, although the tendency that the lower the vertical resolution becomes, the more the jitter increases is substantially the same as in the case of the normal detection method shown in FIG. 3A, the jitter starts increasing at a higher vertical resolution than in the case of the normal detection. FIG. 17B is a graph obtained by plotting the relationship between the vertical resolution and the increment of the jitter due to the quantization noise, the relationship being obtained from the result of FIG. 17A. According to the result of FIG. 17B, if substantially the same rough criteria as in the case of the normal detection method described above is applied with respect to the level of the jitter increment, the S/N ratio of the reproduced signal is deteriorated due to the influence of the quantization noise at the vertical resolution equal to or lower than 8 bits in the case of the Homodyne phase diversity detection. As described above, in the Homodyne phase diversity detection method, the vertical resolution at which the S/N ratio starts being affected by the quantization noise rises to a level higher than in the case of the normal detection method. The reason therefor will be explained below.

In the Homodyne phase diversity detection described in Document 1 and Document 2, the two differential signals are digitalized by the A/D converter, and the subsequent squaring calculation and adding calculation are performed by digital signal processing. When digitalizing a signal by the A/D converter, in general, the amplitude of the input signal is previously adjusted to be approximated to the full-scale input range of the A/D converter to thereby make full and effective use of the vertical resolution. For example, in the case of the reproduced signal due to the normal detection method shown in FIG. 1, the total amplitude ($I_H$–$I_L$) is approximated to the full-scale input range of the A/D converter.

In contrast, in the case of the Homodyne phase diversity detection, the total amplitude $A_{dif}$ of each of the differential signals Sig1 and Sig2 shown in FIG. 2 is approximated to the full-scale input range of the A/D converter, and then the signals are input. However, since the amplitude $a_{RF}$ of the reproduced signal component in each of the difference signals Sig1 and Sig2 is significantly small with respect to the total amplitude $A_{dif}$ as shown in FIG. 2, the effective vertical resolution with respect to the reproduced signal component is remarkably small compared to the case of the normal detection. Therefore, if the vertical resolution of the A/D converter is not sufficiently high, the S/N ratio of the differential signal after being digitalized is deteriorated due to the influence of the quantization noise, and thus, the S/N ratio of the reproduced signal generated from the differential signals is also deteriorated. The reason that, in the Homodyne phase diversity detection method, the vertical resolution, at which the S/N ratio starts being affected by the quantization noise, rises to a level higher than in the case of the normal detection method is as described above.

In the case of the Homodyne phase diversity detection method, the effective vertical resolution with respect to the reproduced signal component $a_{RF}$ in the differential signal is decreased to a level ($a_{RF}/A_{dif}$) times of that of the case of the normal detection method. The value ($a_{RF}/A_{dif}$) varies within the range shown in the formula (8) in accordance with the variation of $a_{RF}$ due to the variation of the phase difference.

$$0 \le \frac{a_{RF}}{A_{dif}} \le \frac{1 - \sqrt{1-m}}{2} \tag{8}$$

$$m = \frac{I_H - I_L}{I_H} \tag{9}$$

Here, m denotes the modulation of the reproduced signal in the case of the normal detection.

In each of the signals Sig1 and Sig2, ($a_{RF}/A_{dif}$) varies in accordance with the phase difference ($\phi_{sig}$–$\phi_{ref}$), the effective vertical resolution varies, and the significance of the influence of the quantization noise also varies in accordance with the phase difference. However, regarding the reproduced signal S generated by the square sum calculation of Sig1 and Sig2, the influence of the quantization noise is maximized in the case in which the amplitude of the reproduced signal component in Sig1 and the amplitude of the reproduced signal component in Sig2 are equal to each other. The case corresponds to the case in which the phase difference takes (2n+1)π/4 wherein n denotes an integer, and in this case, ($a_{RF}/A_{dif}$) is expressed as the formula (10).

$$\frac{a_{RF}}{A_{dif}} = \frac{1 - \sqrt{1-m}}{2\sqrt{2}} \tag{10}$$

Therefore, the proportion of the effective vertical resolution with respect to the amplitude a of the reproduced signal component in the differential signal to that of the reproduced signal due to the normal detection is as follows.

$$\frac{1 - \sqrt{1-m}}{2\sqrt{2}}$$

Therefore, the loss ΔR (bits) of the vertical resolution is expressed as the formula (11) at worst.

$$\Delta R = \log_2\left(\frac{2\sqrt{2}}{1 - \sqrt{1-m}}\right) \tag{11}$$

For example, in the case in which the value of the modulation m is 0.4, which is defined as the lower limit in the BD standard, the loss ΔR of the vertical resolution is about 3.6 bit. Therefore, even if the A/D converter with the vertical resolution of 8 bit is used, the vertical resolution of about 4.4 bit can only be obtained effectively. Therefore, the S/N ratio of the reproduced signal is deteriorated due to the influence of the quantization noise, and it becomes unachievable to maximally obtain the amplification effect of the signal amplitude due to the Homodyne detection.

SUMMARY OF THE INVENTION

An object of the invention is to provide a measure for reproducing information without deteriorating the S/N ratio of the reproduced signal in an optical disc reproduction apparatus using the Homodyne phase diversity detection method.

Hereinafter, an exemplary measure for achieving the object described above will be explained.

1. In the optical disc reproduction apparatus using Homodyne phase diversity detection, the optical information reproduction apparatus is arranged to have an A/D converter for digitalizing a differential signal having a vertical resolution equal to or higher than 9 bits. In other words, the vertical resolution of the A/D converter for digitalizing the differential signal is arranged to be higher than the vertical resolution necessary and sufficient for the case of the normal detection (i.e., the minimum vertical resolution in the range in which the influence of the quantization noise on the reproduced signal in the case of the normal detection is negligible) by a predetermined number of bits.

In the present configuration, in the Homodyne phase diversity detection method, the vertical resolution of the A/D converter is limited within the range in which the influence of the quantization noise generated in the digitization of the differential signal is negligible. In the case of the Homodyne phase diversity detection, the relationship between the vertical resolution and the jitter increment due to the quantization noise is as shown in FIG. 17B. As described above, the influence of the quantization noise becomes normegligible if the jitter increment due to the quantization noise exceeds about 3%. However, by setting the vertical resolution to a value equal to or higher than 9 bits, the jitter increment can be suppressed within about 1.5%. According to the present configuration, since the differential signal can be digitalized without being affected by the quantization noise, the amplification effect of the signal amplitude using the Homodyne detection to be received can be maximized.

It should be noted that although the flash type A/D converter is used for digitalizing such a high-speed signal as the optical disc reproduced signal, in the case of this method, since the circuit size is doubled every time the vertical resolution is increased by 1 bit, it is conceivable that the upper limit of the vertical resolution achievable for the actual circuit is around 20 bits. Therefore, the realistic upper limit is around 20 bits.

2. Further, it is arranged that the vertical resolution of the A/D converter is determined based on the minimum modulation.

Here, the modulation denotes a value obtained by normalizing the total amplitude of the reproduced signal in the case of the normal detection using the level of the upper envelope. The minimum modulation denotes the lower limit of the possible modulation in the use state of the medium.

In the present configuration, the configuration 1 described above is made more specific. As expressed by the formula (II), since the loss of the vertical resolution due to the envelope variation of the differential signal depends on the modulation, it is appropriate to determine the increment of the number of the bits of the vertical resolution based on the modulation. Further, since the lower the modulation becomes, the larger the loss of the vertical resolution becomes, by arranging that the vertical resolution necessary for the case of the lowest possible modulation in the use state of the medium, it becomes possible to always obtain the necessary vertical resolution in the use state of the medium.

3. Further, denoting the minimum modulation with $m_{min}$, the number R (bits) of bits of the vertical resolution of the A/D converter described above is arranged to fulfill the formula (12).

$$R \geq 7 + \log_2\left(\frac{2\sqrt{2}}{1 - \sqrt{1 - m_{min}}}\right) \quad (12)$$

In the present configuration, the number of bits of the vertical resolution of the A/D converter in the configuration 2 described above is made more specific. According to the formula (II), since the loss (bits) of the effective vertical resolution due to the envelope variation of the differential signal is expressed as follows denoting the modulation with m, the second term of the right side of the formula (12) represents the loss of the vertical resolution in the case in which the modulation is the minimum modulation.

$$\log_2\left(\frac{2\sqrt{2}}{1 - \sqrt{1 - m}}\right)$$

As described above, since the vertical resolution of the A/D converter is 7 or 8 bits in the optical disc reproduction apparatus with the normal detection method of the related art, in the present configuration it is arranged that the necessary and sufficient vertical resolution for the reproduced signal component can always be assured in the use state of the medium by previously compensating the loss of the vertical resolution in the case in which the modulation is the minimum modulation taking the 7 bits as a standard. Thus, it is possible to determine the vertical resolution of the A/D converter to be the necessary and sufficient level, and therefore, it is possible to assure the necessary reproduced signal quality without excessively increasing the cost of the apparatus.

4. Further, an absolute value calculator for obtaining the absolute value of the differential signal is disposed in an anterior stage of the A/D converter for digitizing the differential signal.

One of the causes of the loss of the vertical resolution generated in the Homodyne phase diversity detection is that the envelope of the differential signal vibrates between the positive and negative polarities, which alone degrades the effective vertical resolution with respect to the reproduced signal component by half. Here, in the Homodyne phase diversity detection, since the reproduced signal is generated by the square sum calculation of the two digitalized differential signals, the same reproduced signal can also be generated by previously obtaining the absolute values of the two differential signals, then digitalizing the absolute values, and then performing the square sum calculation. The present configuration is provided with the absolute value calculator disposed in the anterior stage of the A/D converter for digitalizing the differential signal, and is arranged so that the effective vertical resolution with respect to the reproduced signal component is improved to double by reducing the total amplitude of the differential signal by half while keeping the amplitude of the reproduced signal component. Thus, the equivalent S/N ratio can be assured even if the vertical resolution of the A/D converter is decreased compared to the configuration without the absolute value calculator.

5. In the configuration 4 described above, the number R (bits) of bits of the vertical resolution of the A/D converter described above is arranged to fulfill the formula (13) denoting the minimum modulation with $m_{min}$.

$$R \geq 7 + \log_2\left(\frac{2\sqrt{2}}{1 - \sqrt{1 - m_{min}}}\right) - 1 \quad (13)$$

Here, $m_{min}$ denotes the minimum modulation, namely the lower limit of the possible modulation in the use state of the medium.

In the present configuration, the increment ΔR of the number of bits of the vertical resolution is decreased by 1 bit compared to the case of not using the absolute value calculator. The reason is that since the loss of the vertical resolution due to the envelope variation of the differential signal is reduced by half due to the absolute value calculation on the differential signal, namely the loss of the vertical resolution is reduced by 1 bit, the effective vertical resolution with respect to the reproduced signal component becomes equivalent to that of the case of not using the absolute value calculator by decreasing ΔR by 1 bit.

According to the present configuration, similarly to the configuration 3 described above, it becomes possible to determine the vertical resolution of the A/D converter to be the necessary and sufficient level, and therefore, it is possible to assure the necessary reproduced signal quality without excessively increasing the cost of the apparatus.

6. In the optical information reproduction apparatus using the Homodyne phase diversity detection, an absolute value calculator for obtaining the absolute value of the differential signal is disposed in an anterior stage of the A/D converter for digitizing the differential signal.

The purpose of introducing the absolute value calculator in the present configuration is substantially the same as in the configurations 4 and 5 described above. In the present configuration, although the absolute value calculator is introduced alone into the optical information reproduction apparatus using the Homodyne phase diversity detection, since the effective vertical resolution with respect to the reproduced signal component in the differential signal is improved to double, the effect of reducing the influence of the quantization noise can similarly be obtained.

According to the invention, in the optical information reproduction apparatus using the Homodyne phase diversity detection, since the influence of the quantization noise on the A/D converter for digitalizing the differential signal is reduced, it becomes possible to more significantly obtain the improvement effect of the S/N ratio of the reproduced signal due to the signal amplification function of the Homodyne phase diversity detection.

DESCRIPTION OF PREFERRED EMBODIMENTS

Some embodiments of the invention will hereinafter be explained with reference to the accompanying drawings.

Embodiment 1

Figure 4:
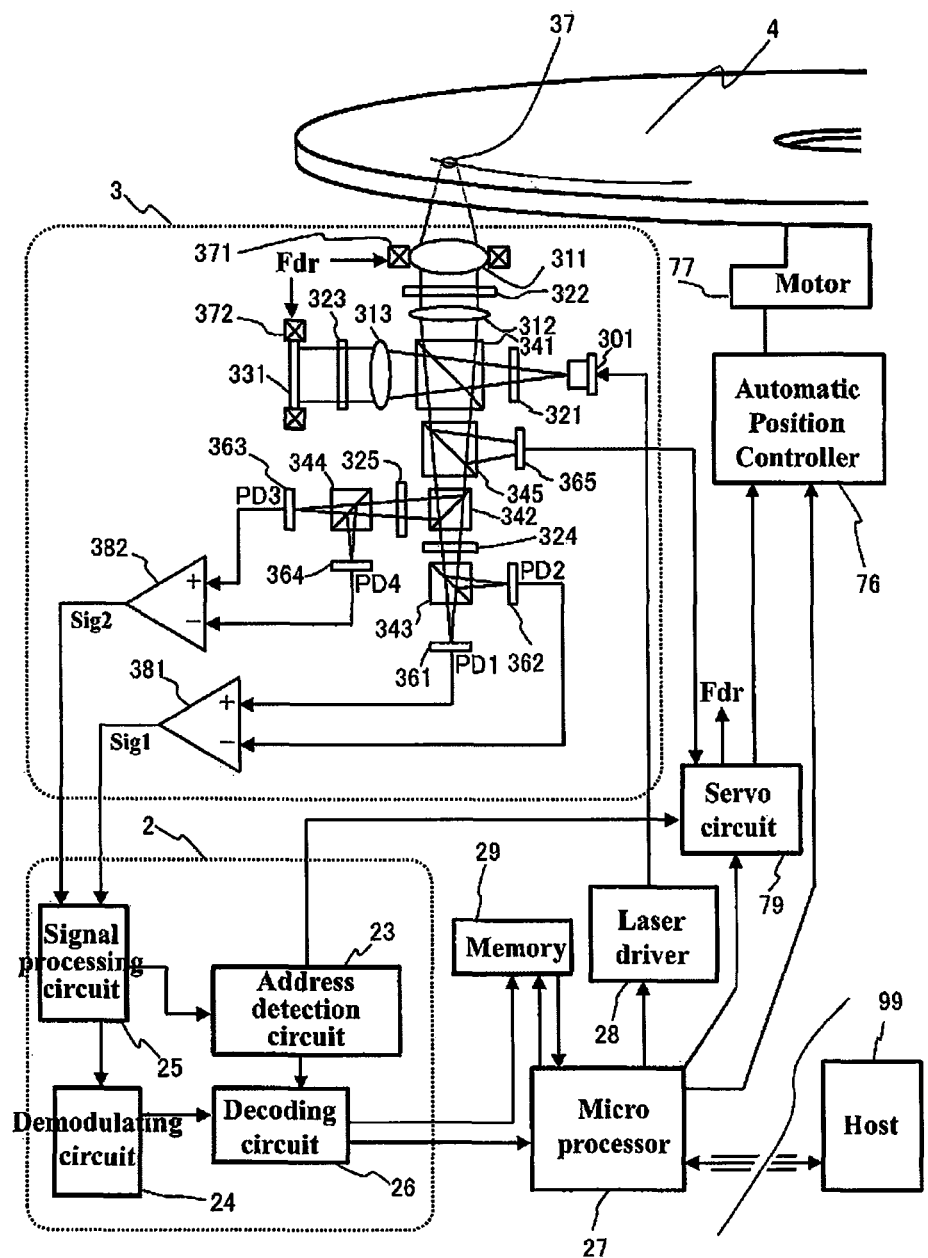
FIG. 4 is a diagram showing an overall configuration of an optical disc reproduction apparatus to which the invention is applied.

FIG. 4 shows a block diagram of an optical disc apparatus as an embodiment of the invention. The light emitted from a blue laser diode 301 with a wavelength of 405 nm mounted on an optical head 3 is transmitted through a first half wave plate 321 to thereby have the polarization direction rotated 45 degrees. The light with the polarization direction rotated is split by a first polarization beam splitter 341 into two linearly-polarized lights perpendicular to each other. The light (reproduction light) with one of the polarized lights is reflected, and is then collimated by a first collimator lens 312 into a parallel light, then transmitted through a first quarter plate 322 to thereby be converted into circularly-polarized light, then collected by an objective lens 311 with an NA of 0.85, and then an optical disc 4 is irradiated with the light. The reflected light (hereinafter referred to as a signal light) from the optical disc 4 is restored again to the parallel light by the objective lens 311, and is then restored to the linearly-polarized light by the first quarter plate 322. However, since the rotational direction of the circularly-polarized light is reversed by the reflection by the disc surface, the direction of the linearly-polarized light is perpendicular to that of the original light. Therefore, the signal light is transmitted through the first polarization beam splitter 341, and proceeds toward a half beam splitter 342. The light (hereinafter referred to as a reference light) with the polarization direction first transmitted through the first polarization beam splitter 341 is collimated by a second collimator lens 313, then converted into a circularly-polarized light while being transmitted through a second quarter wave plate 323, then reflected by a reference light beam reflecting section 331, and then converted into linearly-polarized light perpendicular to the original reference light by the second quarter wave plate 323 similarly to the signal light. Therefore, the reference light is reflected in turn by the first polarization beam splitter 341, and proceeds toward the half beam splitter 342 after being combined with the signal light. On this occasion, the signal light and the reference light are combined with each other in the state in which the respective polarization directions are perpendicular to each other. A part of the combined light is guided by a servo beam splitter 345 to a servo detector 365, and then guided to a servo circuit 79 for generating the servo signals for focusing, tracking, and so on.

One of the combined light having been transmitted through the servo beam splitter 345 is transmitted through the half beam splitter 342 as a half mirror, then turned 45 degrees in the polarization direction by a second half wave plate 324, then split by a polarization beam splitter 343 into linearly-polarized lights perpendicular to each other, and then detected by a first photodetector 361 (PD1) and a second photodetector 362 (PD2). The signals, which can be obtained on this occasion, are the same as those of EMBODIMENT 1, and the signals expressed by the formulas (1) and (2) are detected by PD1, PD2. The outputs of PD1, PD2 are input to a differential circuit 381, and the differential signal Sig1 is generated.

The other of the combined light is reflected by the half beam splitter 342 as a half mirror, and is then converted into circularly-polarized light by a third quarter wave plate 325 disposed so as to rotate 45° with respect to the polarization direction of the signal light and the reference light. On this occasion, the signal light and the reference light have respective original polarization directions 90 degrees different from each other, and are therefore converted into the circularly-polarized lights with respective rotational directions opposite to each other. The circularly-polarized lights are split by a polarization beam splitter 344 into linearly-polarized lights perpendicular to each other, and are detected by a third photodetector 363 (PD3) and a fourth photodetector 364 (PD4), respectively. The outputs of PD3, PD4 are input to a differential circuit 382, and the differential signal Sig2 is generated. The differential signals Sig1 and Sig2 thus generated are input to a signal processing circuit 25 provided to a reproduction block 2. Here, upon inputting the signals, the signal processing circuit 25 samples Sig1 and Sig2 to thereby digitalize them, and then performs the subsequent process using digital calculation. Therefore, the process of the formula (7) is performed using digital calculation.

The reproduced signal S generated in the signal processing circuit 25 described above, on which an appropriate digital equalization process has been performed, is input to a demodulating circuit 24 and an address detection circuit 23, and then transmitted to a memory 29 and a micro processor 27 as user data by a decoding circuit 26. The micro processor controls the arbitrary servo circuit 79 and an automatic position controller 76 in accordance with an instruction from a host apparatus 99 to thereby positions an optical spot 37 to arbitrary addresses. The micro processor 27 controls a laser driver 28 in accordance with whether the instruction from the host apparatus is reproduction or recording, and makes a laser 301 emit light with appropriate power/wavelength. The servo circuit 79 controls a focus actuator 371 based on the servo signal, and at the same time, controls a light path difference adjustment section 372 to thereby control the position of a reference light beam reflecting section 331 with the light path difference adjustment section 372 in accordance with the variation of the light path length of the signal light due to displacement of the objective lens 311 so as to always keep the difference in light path length between the reference light and the signal light in a value equal to or smaller than 20 μm. The distance of 20 μm described above is sufficiently small compared to the coherent length of 70 μm of the blue laser diode 301 used in the present embodiment, and thus, the reference light and the signal light are always kept in a roughly perfectly coherent state.

Figure 5:
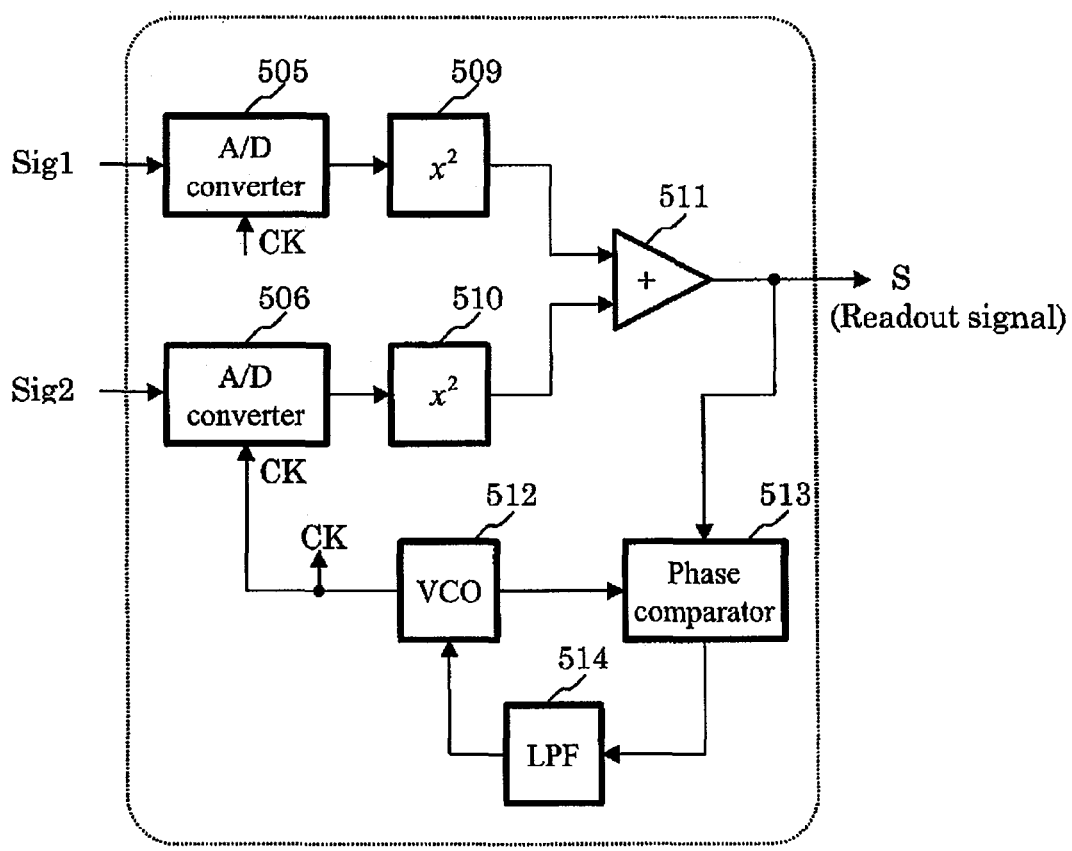
FIG. 5 is a diagram showing a configuration of a circuit block of a signal processing circuit.

FIG. 5 shows a specific example of the configuration of the circuit block of the signal processing circuit 25. The two differential signals Sig1 and Sig2 thus input are respectively digitalized by A/D converters 505 and 506. The vertical resolution of each of the A/D converters 505 and 506 is 10 bits. As described above, it is characteristic that the vertical resolution of each of the two A/D converters is equal to or higher than 9 bits. Here, the vertical resolution is the number of discrete levels after the digitalization corresponding to the input voltage range of the A/D converter, and is represented by the number (integer) of bits of the binary number. As described later, the vertical resolution of the A/D converter in the present embodiment is arranged to be 4 bits higher than the vertical resolution (6 bits) necessary and sufficient for the case of the normal detection. The bit width of the differential signals Sig1 and Sig2 thus digitalized is 10 bits, which is the same as the vertical resolution of the A/D converters 505 and 506. The subsequent digital signal processing is performed with the bit width of 24 bits. The bit width is sufficient to perform the digital signal processing on the differential signals, which have been digitalized at a vertical resolution of 10 bits.

The differential signals Sig1 and Sig2 thus digitalized are added to each other by an adder 511 after squaring calculation is performed thereon by squaring calculators 509, 510, respectively, and thus, the reproduced signal S is generated. Specifically, the reproduced signal S is generated by the calculation shown in formula (7) using the differential signals Sig1 and Sig2. The sampling timing of the A/D converters 505 and 506 is generated by performing phase comparison between the output of the adder 511 and the output of the voltage-controlled oscillator (VCO) 512 using a phase comparator 513, then averaging the output of the phase comparator using a low-pass filter (LPF) 514, and then feeding back the result to the control input of the VCO. Specifically, the clock output (CK), on which the phase control is performed by a phase-locked loop (PLL) circuit including the phase comparator 513, the VCO 512, and the LPF 514, is obtained to thereby control the timing of the A/D conversion.

Embodiment 2

Figure 6:
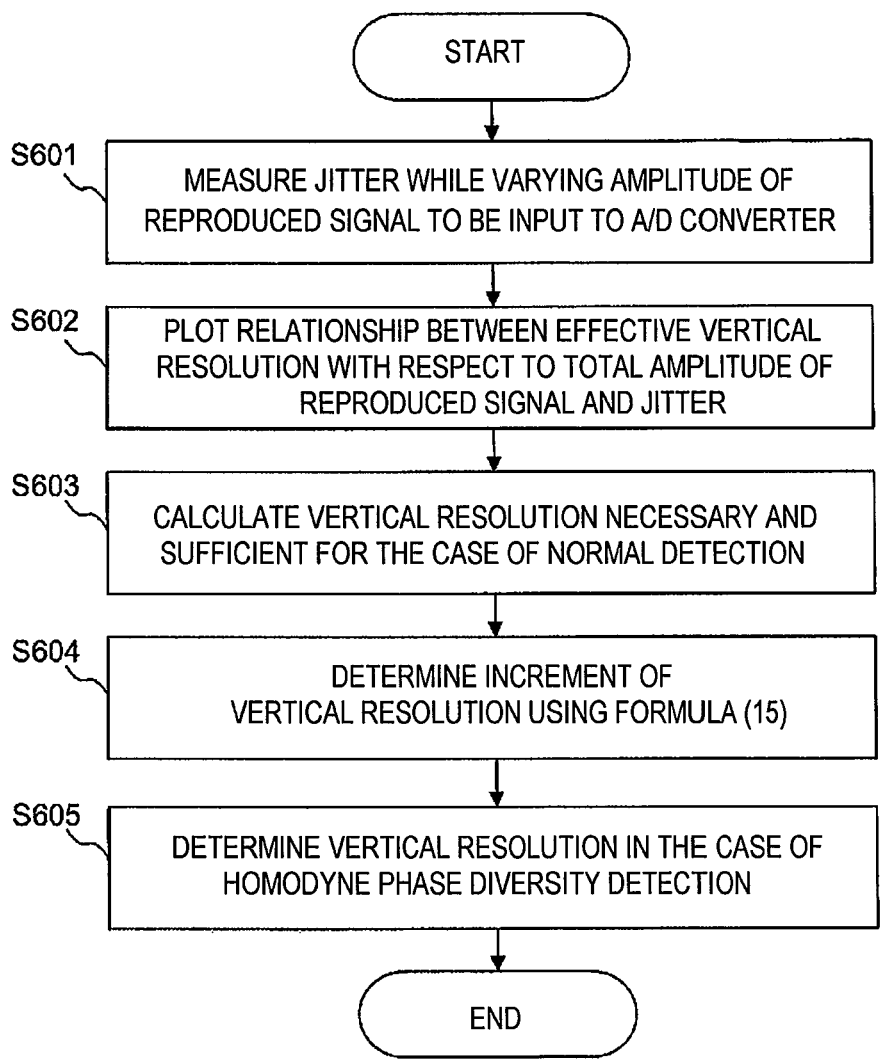
FIG. 6 is a flowchart showing a procedure of determining the vertical resolution.

FIG. 6 is a flowchart showing a procedure of determining the vertical resolution of the A/D converters 505 and 506 in EMBODIMENT 1 described above. As an overall flow, the vertical resolution $R_{RF0}$ necessary and sufficient for the case of the normal detection is obtained in the steps S601 through S603, the increment $\Delta R$ of the vertical resolution is determined in the step S604, and the vertical resolution R in the case of the Homodyne phase diversity detection is determined in the step S605 based on $R_{RF0}$ and $\Delta R$.

Figure 12:
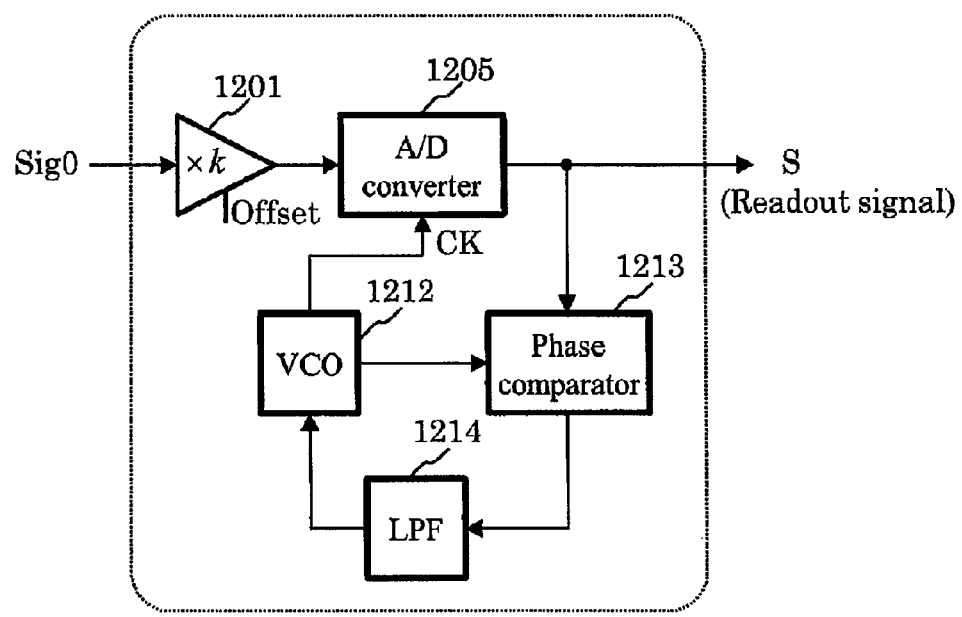
FIG. 12 is a diagram showing a signal processing circuit for obtaining the necessary and sufficient vertical resolution in the case of the normal detection.

Step S601:

FIG. 12 is a diagram showing a signal processing circuit used for obtaining the necessary and sufficient vertical resolution in the case of the normal detection. The reference symbol Sig0 denotes the reproduced signal obtained using a normal detector, which does not use the Homodyne phase diversity detection. The reproduced signal Sig0 is obtained by, for example, using a disc medium of a type with a single recording layer so that the sufficient S/N ratio with respect to the detection system noise, and thus, it is arranged that the influence of the quantization noise is dominant on the S/N ratio of the reproduced signal after the digitalization. In the present embodiment, the signal is generated by calculating the reproduced signal waveform using an optical simulation, and then outputting the result using an arbitrary waveform generator. The amplitude of the reproduced signal Sig0 input to the signal processing circuit is variably adjusted using a signal adjustor 1201, and then digitalization is performed by the A/D converter 1205 to thereby generate the digital reproduced signal S. The timing for the digitalization is obtained by the clock output (CK), on which the phase control is performed by a phase-locked loop (PLL) circuit including a phase comparator 1213, a VCO 1212, and an LPF 1214, based on the output of the A/D converter 1205. After performing an appropriate digital signal processing on the reproduced signal S thus generated, an index value (e.g., a jitter, a level jitter based on the partial response maximum likelihood, and an error rate) reflecting the S/N ratio of the reproduced signal is measured. By repeating this process a plurality of times while varying the amplitude of the reproduced signal, the relationship between the amplitude of the reproduced signal and the index value is obtained.

Step S602:

Based on the relationship between the amplitude of the reproduced signal and the jitter obtained in the step S601, a relationship between an effective vertical resolution $R_{RF}$ with respect to the total amplitude of the reproduced signal and the jitter is plotted. Here, $R_{RF}$ can be obtained using the formula (14) assuming that the total amplitude of the reproduced signal is $A_{RF}$, the vertical resolution of the A/D converter 1205 is $R_{AD}$, and an input voltage range of the A/D converter 1205 is $A_{AD}$.

$$R_{RF} = R_{AD} + \log_2\left(\frac{A_{RF}}{A_{AD}}\right) \quad (14)$$

Figure 3A:
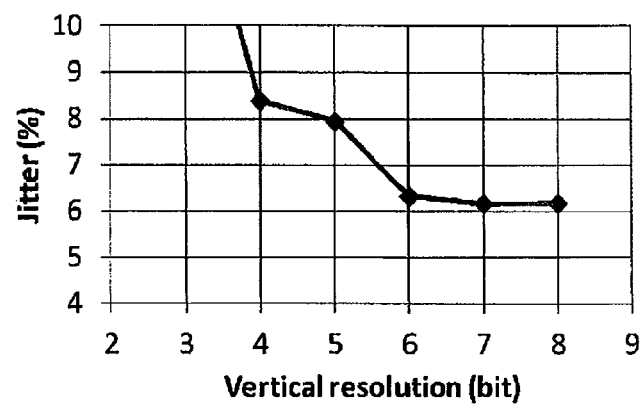
FIG. 3A is a graph showing a relationship between the vertical resolution and the jitter of the A/D converter in the normal detection.

The relationship between $R_{RF}$ and the jitter is, for example, as shown in FIG. 3A.

Step S603:

Based on the relationship between the effective vertical resolution $R_{RF}$ with respect to the total amplitude of the reproduced signal and the jitter, the minimum $R_{RF}$ in the range in which the jitter increment due to the quantization noise is equal to or lower than 3% is obtained, and is then determined as the vertical resolution $R_{RF0}$ necessary and sufficient for the case of the normal detection.

Step S604:

Assuming that the minimum modulation is $m_{min}$, the increment $\Delta R_0$ of the vertical resolution is calculated as the minimum $\Delta R$ fulfilling the formula (15). Here, the minimum modulation denotes the lower limit of the possible modulation in the use state of the medium, and is often defined by the physical standard of the disc in optical discs.

$$\Delta R \geq \log_2\left(\frac{2\sqrt{2}}{1 - \sqrt{1 - m_{min}}}\right) \quad (15)$$

Step S605:

The vertical resolution R (bits) of the A/D converters 505 and 506 is determined based on the formula (16) using $R_{RF0}$ and $\Delta R_0$.

$$R = R_{RF0} + \Delta R_0 \quad (16)$$

Figure 3B:
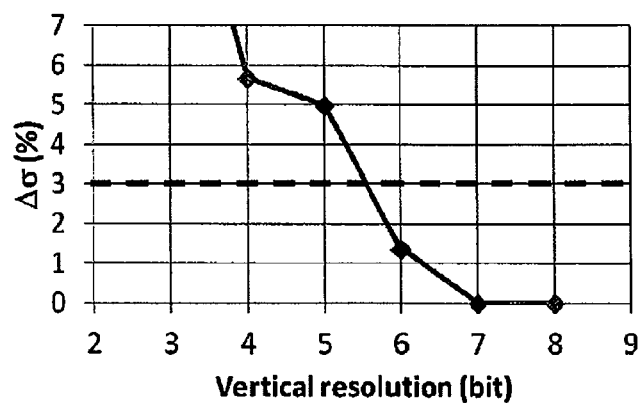
FIG. 3B is a graph showing a relationship between the vertical resolution and the jitter increment due to the influence of the quantization noise.

Based on the procedure described above, the reason that the vertical resolution of the A/D converters 505 and 506 is determined to be 10 bits in EMBODIMENT 1 will be described. Firstly, in the procedure of the steps S601 through S603, the relationship between the effective vertical resolution $R_{RF}$ with respect to the total amplitude of the reproduced signal and the jitter is obtained as shown in FIG. 3A. According to this result, the relationship between $R_{RF}$ and the jitter increment $\Delta\sigma$ due to the quantization noise is obtained as shown in FIG. 3B, and the minimum $R_{RF}$ in the range in which the jitter increment $\Delta\sigma$ is equal to or lower than 3% is 6 bits. Thus, it is obtained that the vertical resolution $R_{RF0}$ necessary and sufficient for the case of the normal detection is 6 bits. Subsequently, in the step S604, assuming that the minimum modulation is 0.4, $\Delta R$ is obtained from the formula (15) as $\Delta R \geq 3.6$, and therefore, the increment $\Delta R_0$ of the vertical resolution is determined to be 4 bits. Finally, in the step S605, the vertical resolution of the A/D converters 505 and 506 is determined to be 6+4=10 bits based on the formula (16).

Here, in reality, in order to perform stable recording and reproduction on all of the layers of the multilayer medium in the present embodiment, a configuration of controlling the spherical aberration in accordance with the variation in the cover layer thickness is required. Although such a configuration is also incorporated in the apparatus (head) according to the present embodiment, the configuration has no relations with the essential effect of the invention, and is therefore, not shown in FIG. 4, and the explanation thereof is also omitted.

It should be noted that although in EMBODIMENT 1 and EMBODIMENT 2, the vertical resolution of the A/D converters 505 and 506 is set to 10 bits, it is obvious that the vertical resolution equal to or higher than 9 bits is effective for some reproduction apparatus in accordance with the relationship between $R_{RF}$ and the jitter, $\Delta R$, and so on.

Embodiment 3

Figure 7:
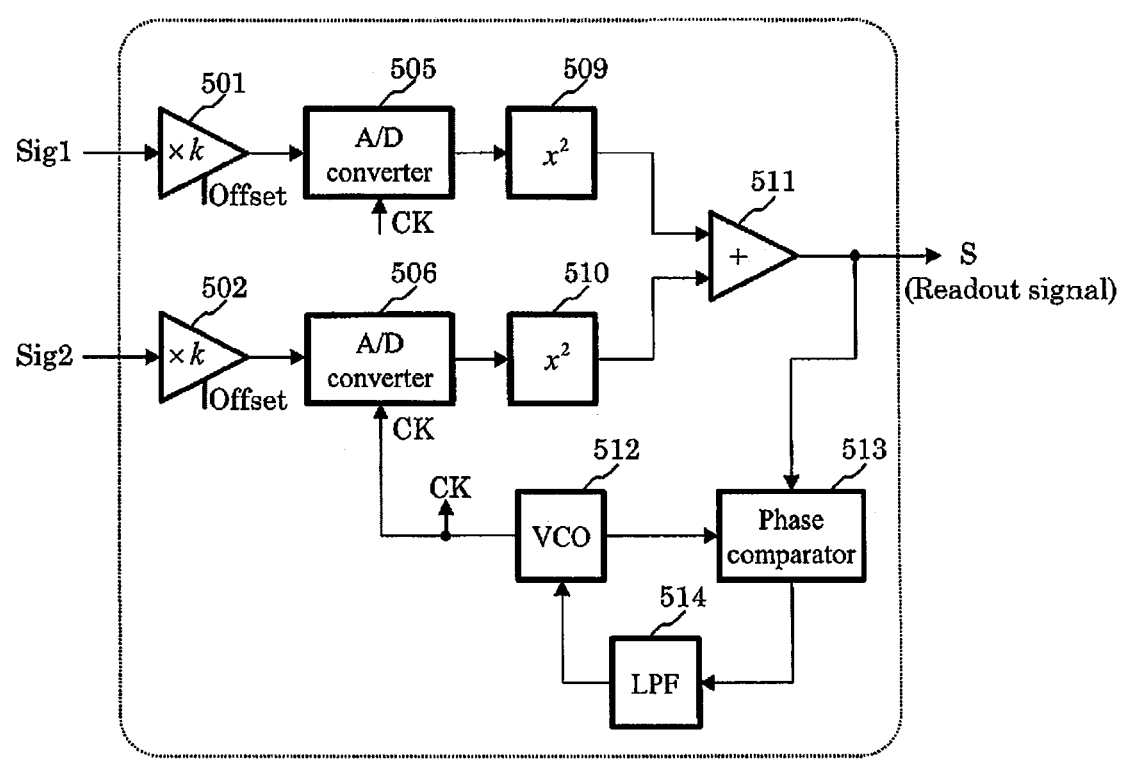
FIG. 7 is a diagram showing another configuration of the circuit block of the signal processing circuit.

FIG. 7 is a diagram showing a configuration of a signal processing circuit added with gain/offset adjustor circuits for applying the gain/offset to the two differential signals in the anterior stage of the A/D converters, respectively, as another embodiment of the signal processing circuit block.

As is pointed out in Document 1 or Document 2, in the case in which imbalance in amplitude between the two differential signals exists, and in the case in which an offset exists in each of the differential signals, the stable reproduced signal independent of the phase difference between the signal light and the reference light fails to be obtained even if the calculation expressed by the formula (7) is performed. According to the present embodiment, by performing an adjustment so that the amplitudes of the two differential signals become equal to each other, and the offset of each of the two differential signals vanishes using the signal adjustors 501, 502 added in the anterior stage of the A/D converters 505 and 506, a more stable reproduced signal can be obtained by the square sum calculation after the digitalization.

Since the imbalance in amplitudes and the offset of the two differential signals are caused by a characteristic variation and an arrangement error of the optical elements in the optical head, or a gain variation, an output offset and so on of a photoelectric conversion amplifier, if the adjustment described above is performed once after assembling the optical head, basically, the stable state is thereafter maintained. It should be noted that there is a possibility that the misalignment is caused by a temporary variation of the optical head after the adjustment, and in such a case, by performing substantially the same adjustment, it becomes possible to obtain the stable reproduced signal again.

Embodiment 4

Figure 8:
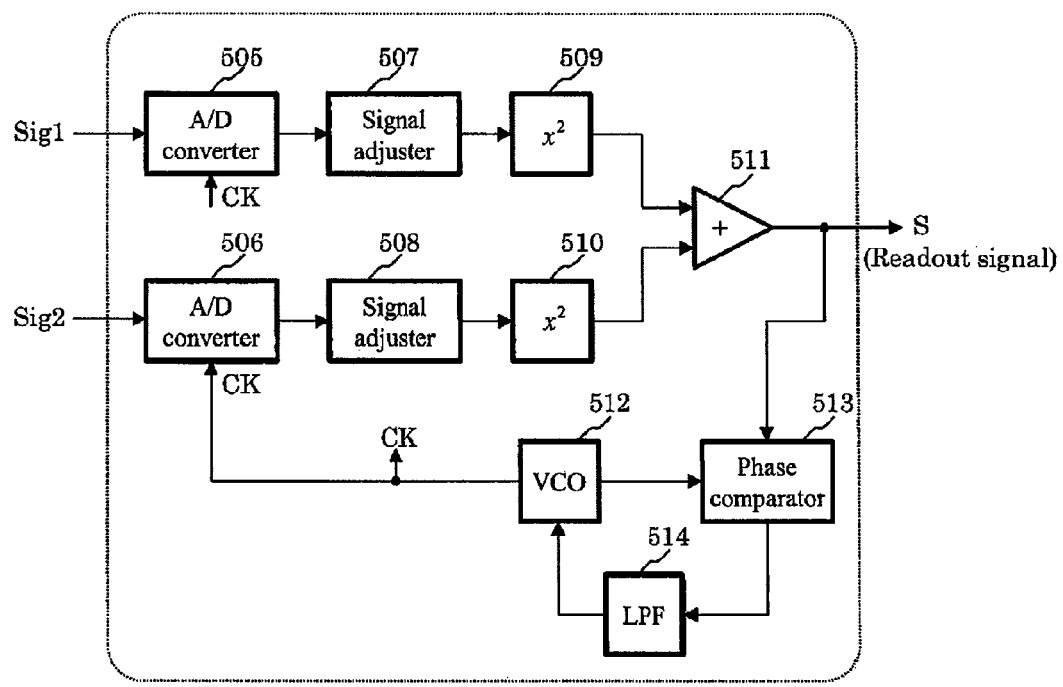
FIG. 8 is a diagram showing another configuration of the circuit block of the signal processing circuit.

FIG. 8 is a diagram showing a configuration of a signal processing circuit added with signal adjustors 507 and 508 for performing gain adjustment and offset application on the differential signals Sig1 and Sig2 thus digitalized between the A/D converters 505, 506 and the squaring calculators 509, 510, respectively, as another embodiment of the signal processing circuit block. The other constituents of the signal processing circuit block are substantially the same as those in the circuit block shown in FIG. 7 in EMBODIMENT 3. An object of the present embodiment is to correct the imbalance in amplitude and the offset of the two differential signals similarly to EMBODIMENT 3. While the gain/offset adjustment is performed by the analog signal section in EMBODIMENT 3, the gain/offset adjustment is performed by the digital signal section in the present embodiment. Also in this case, since the imbalance in amplitude and the offset of the two differential signals are corrected in the anterior stage of the squaring calculators 509 and 510, substantially the same effect as in the case of EMBODIMENT 3 can be obtained. Further, as an advantage obtained by realizing the gain/offset adjustment circuit by the digital signal section, there can be cited the point that since the gain value and the offset value to be set to each of the signal adjustors can easily be updated, the gain/offset adjustment can adaptively be performed in accordance with the state of the reproduced signal to be generated.

Embodiment 5

Figure 1:
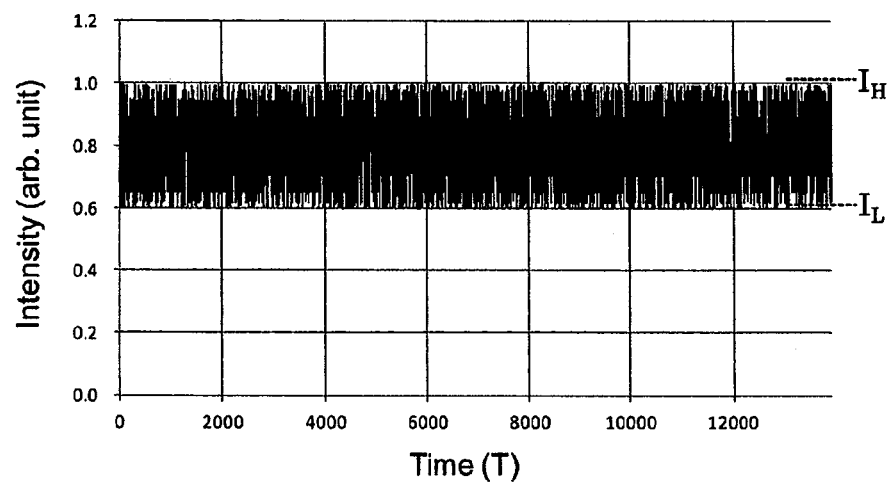
FIG. 1 is a diagram showing an example of a reproduced signal waveform in the normal detection.
Figure 2:
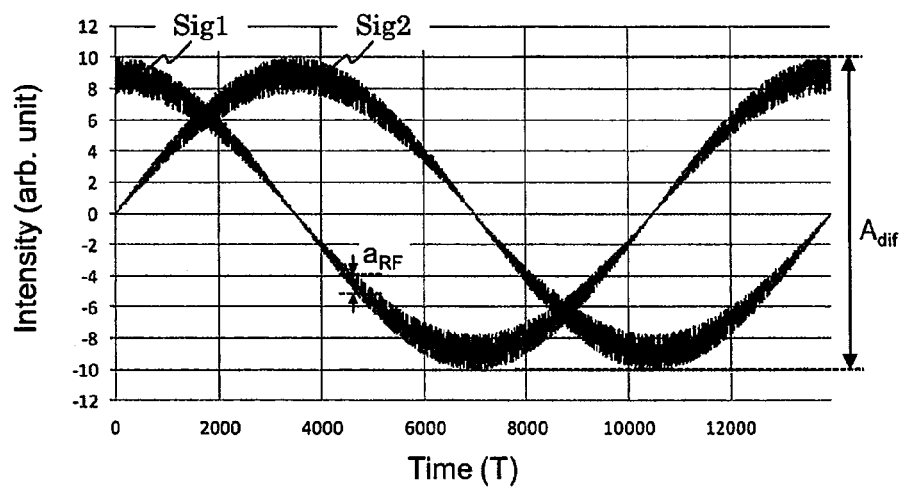
FIG. 2 is a diagram showing an example of two differential signal waveforms in the Homodyne phase diversity detection.
Figure 9:
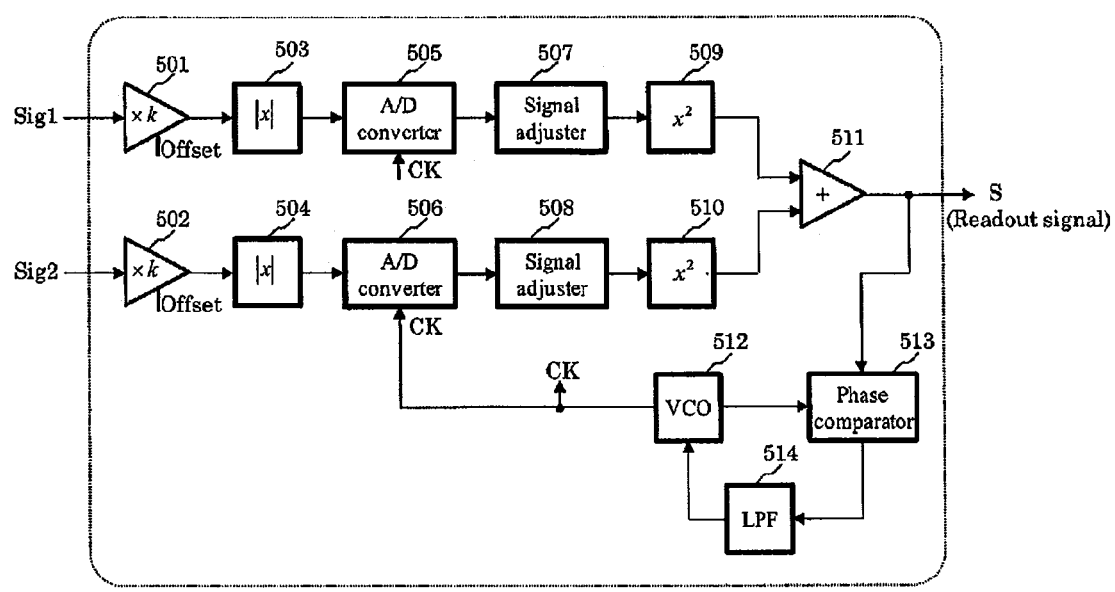
FIG. 9 is a diagram showing another configuration of the circuit block of the signal processing circuit.
Figure 10:
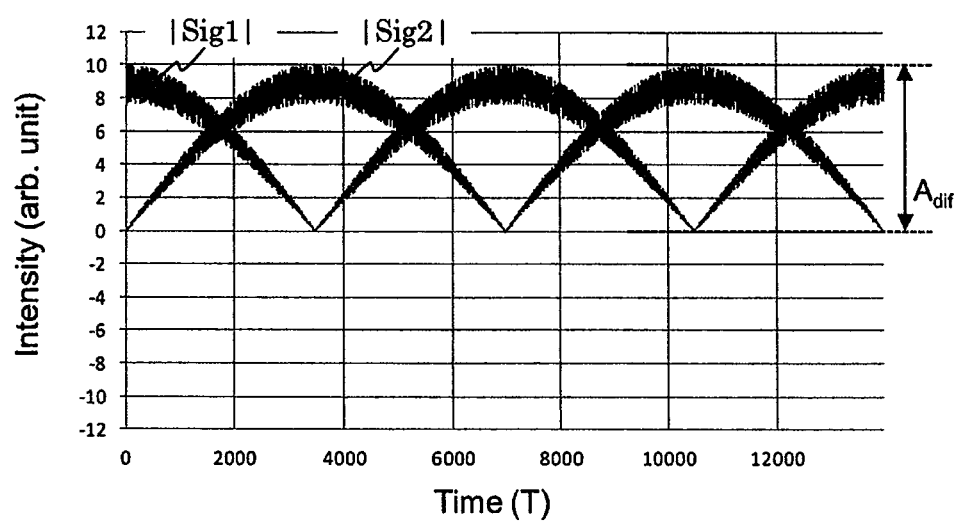
FIG. 10 is a diagram showing waveforms of differential signals on which an absolute value calculation has been performed.

FIG. 9 shows another embodiment of the circuit block of the signal processing circuit 25 in EMBODIMENT 1 through EMBODIMENT 3, added with absolute value calculators 503 and 504 between the signal adjustors 501 and 502, and the A/D converters 505 and 506, respectively. The other circuit constituents are substantially the same as those of the circuit shown in FIG. 8 in EMBODIMENT 3. Here, the signal adjustors 501 and 502, and the absolute value calculators 503 and 504 are each an analog calculator. The analog differential signals Sig1 and Sig2 thus input are adjusted in amplitude and offset by the signal adjustors 501 and 502, respectively, and then the absolute value calculation is performed thereon by the absolute value calculators 503 and 504, respectively. For example, in the case in which Sig1 and Sig2 have the waveforms shown in FIG. 2, the waveforms of the differential signals |Sig1| and |Sig2| are obtained as shown in FIG. 10, respectively. Specifically, due to the absolute value calculation, the total amplitude of the differential signal is reduced by half.

The differential signals |Sig1| and |Sig2| obtained by performing the absolute calculation have the amplitudes and offsets adjusted by the respective signal adjustors so as to match the input voltage ranges of the respective A/D converters 505 and 506. The vertical resolution of each of the A/D converters 505 and 506 is 9 bits. The two differential signals Sig1 and Sig2 thus input are respectively digitalized by A/D converters 505 and 506. The two differential signals thus digitalized are each a signal with a bit width of 9 bits. The subsequent signal processing is substantially the same as in EMBODIMENT 3, and is therefore omitted from the explanation.

Embodiment 6

Figure 11:
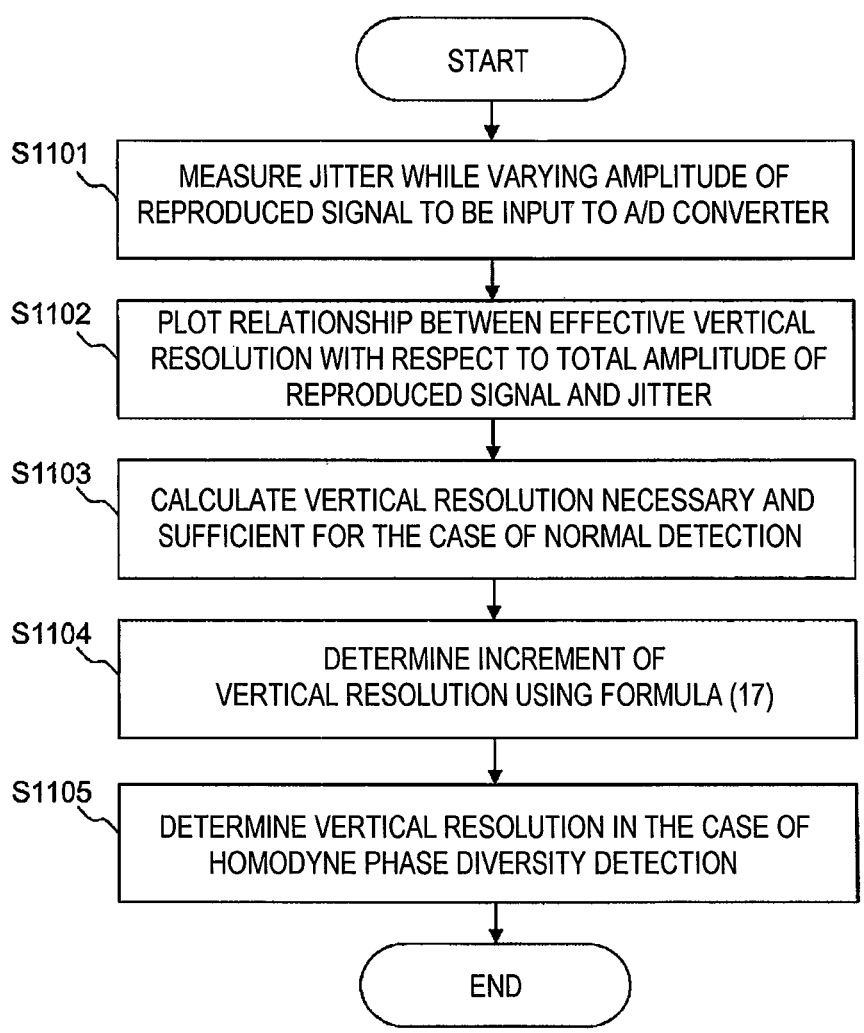
FIG. 11 is a flowchart showing a procedure of determining the vertical resolution.

FIG. 11 is a flowchart showing a procedure of determining the vertical resolution of the A/D converters 505 and 506 in EMBODIMENT 5 described above. As an overall flow, the vertical resolution $R_{RF0}$ necessary and sufficient for the case of the normal detection is obtained in the steps S1101 through S1103, the increment $\Delta R$ of the vertical resolution is determined in the step S1104, and the vertical resolution R in the case of the Homodyne phase diversity detection is determined in the step S1105 based on $R_{RF0}$ and $\Delta R$.

Step S1101:

Similarly to the step S601 in EMBODIMENT 2, the relationship between the amplitude of the reproduced signal and the index value is obtained.

Step S1102:

Similarly to the step S602 in EMBODIMENT 2, the relationship between the effective vertical resolution R with respect to the total amplitude of the reproduced signal and the jitter is plotted.

Step S1103:

Similarly to the step S603 in EMBODIMENT 2, the vertical resolution $R_{RF0}$ necessary and sufficient for the case of the normal detection is determined.

Step S1104:

Assuming that the minimum modulation is $m_{min}$, the increment $\Delta R_0$ of the vertical resolution is calculated as the minimum $\Delta R$ fulfilling the formula (17).

$$\Delta R \geq \log_2\left(\frac{2\sqrt{2}}{1 - \sqrt{1 - m_{min}}}\right) - 1 \tag{17}$$

Step S1105:

Similarly to the step S605 in EMBODIMENT 2, the vertical resolution R (bits) of the A/D converters 505 and 506 is determined based on the formula (16).

The procedure described above is roughly the same as in EMBODIMENT 2, but is different from EMBODIMENT 2 in that the increment of the vertical resolution is defined by the formula (17). The increment of the vertical resolution in the present embodiment is smaller than in the case of EMBODIMENT 2 by 1 bit. The reason is that since the loss of the vertical resolution due to the envelope variation of the differential signal is reduced by half due to the absolute value calculation on the differential signal, namely the loss of the vertical resolution is reduced by 1 bit, the increment of the vertical resolution is allowed to be reduced by 1 bit. Therefore, while the vertical resolution of the A/D converters 505 and 506 in EMBODIMENT 2 is set to 10 bits, the vertical resolution thereof is set to 9 bit in the case of EMBODIMENT 5.

Embodiment 7

In actually manufacturing the optical head, an error from an ideal value occurs in a variety of parameters of the optical system such as the reflectance, the transmittance, and the amount of delay of the half beam splitter 342, the amount of delay and the setting angle of the half wave plate 324 and the quarter wave plate 325, or the conversion efficiency and offset of the photodetectors 361, 362, 363, and 364. Due to these errors, the outputs $I_{PD1}$, $I_{PD2}$, $I_{PD3}$, and $I_{PD4}$ of the detectors can no longer be described by such formulas as the formulas (1), (2), (3), and (4). In general, the differential outputs Sig1 and Sig2 in the case in which such errors exist are expressed as the formulas (18) and (19), respectively. The symbols a, r, $b_1$, $b_2$, and $\delta$ each denote a constant.

$$Sig1 = a|E_{sig}||E_{ref}|\cos(\varphi_{sig} - \varphi_{ref}) + b_1 \tag{18}$$

$$Sig2 = \frac{a}{r}|E_{sig}||E_{ref}|\sin(\varphi_{sig} - \varphi_{ref} + \delta) + b_2 \tag{19}$$

If the same square sum calculation as in the ideal case is output to these cases, a term depending on the interference phase generally remains. However, if the formulas (20), (21), and (22) are adopted, Sig1' and Sig2" have the same configurations as Sig1 and Sig2 in the ideal case, and the square sum of these outputs is obtained as the formula (23), which is an output independent of the phase.

$$Sig1' = Sig1 - b_1 = a|E_{sig}||E_{ref}|\cos(\varphi_{sig} - \varphi_{ref}) \tag{20}$$

$$Sig2' = r(Sig2 - b_2) = a|E_{sig}||E_{ref}|\sin(\varphi_{sig} - \varphi_{ref} + \delta) \tag{21}$$

$$Sig2'' = \frac{Sig2' - Sig1'\sin\delta}{\cos\delta} = a|E_{sig}||E_{ref}|\sin(\varphi_{sig} - \varphi_{ref}) \tag{22}$$

$$Sig1'^2 + Sig2''^2 = \tag{23}$$
$$[a|E_{sig}||E_{ref}|\cos(\varphi_{sig} - \varphi_{ref})]^2 + [a|E_{sig}||E_{ref}|\sin(\varphi_{sig} - \varphi_{ref})]^2 =$$
$$a|E_{sig}|^2|E_{ref}|^2$$

By describing the formula (23) using Sig1 and Sig2, the formula (24) is obtained, which is a second-order polynomial of Sig1 and Sig2 (where, $s=\sin\delta$).

$$Sig1'^2 + Sig2''^2 = Sig1'^2 + \left(\frac{Sig2' - Sig1'\sin\delta}{\cos\delta}\right)^2 \tag{24}$$

$$= \frac{1}{\cos^2\delta}(Sig1'^2 + Sig2'^2) - \frac{2\sin\delta}{\cos^2\delta}Sig1' + Sig2'$$

-continued $$= \frac{1}{\cos^2\delta}[(Sig1-b_1)^2 + r^2(Sig2-b_2)^2 - 2r\sin\delta(Sig1-b_1)(Sig2-b_2)]$$

$$= \frac{1}{\cos^2\delta}\begin{bmatrix} Sig1^2 + r^2Sig2^3 - 2rs\sin\delta Sig1Sig2 + \\ (-2b_1 + 2rsSig2)Sig1 + (2rsb_1 - 2r^3b^2)Sig2 + \\ (b_1^2 + r^2b_1^2 - 2rsSig1Sig2) \end{bmatrix}$$

Therefore, by expressing the calculation output by the second-order polynomial of Sig1 and Sig2, and setting the coefficients of the respective terms to the values of the formula (24), the output signal independent of the interference phase similarly to the ideal case can be obtained. It should be noted that in order to make the amplitude of the output signal equivalent to the ideal case, in reality, the value obtained by dividing the formula (24) by the square of $1/\cos\delta$ is set to the target value of each of the coefficients, and the coefficient of the square term of Sig1 is fixed to 1 as in the following formula.

$$Sig1^2 + r^2Sig2^2 - 2rs\sin\delta Sig1Sig2 + (-2b_1 + 2rsSig2)Sig1 + \quad (25)$$
$$(2rsb_1 - 2r^2b^2)Sig2 + (b_1^2 + r^2b_2^2 - 2rsSig1Sig2) \equiv$$
$$Sig1^2 + c_1Sig2^2 + c_2Sig1Sig2 + c_3Sig1 + c_4Sig2 + c_5$$

It should be noted that since the square of $1/\cos\delta$ varies as small as about ±3% in the actual variable range of $\delta$, namely about ±10 degrees, the division described above hardly affects the amplitude of the output signal. Further, the constant term $c_5$ of the formula (25) has no relation to the dependency on the interference phase, and is uniquely determined from the coefficients $c_1$, $c_2$, $c_3$ and $c_4$ of other terms as described below.

$$c_5 = \frac{c_1c_3^2 - c_2c_3c_4 + c_4^2}{4c_1 - c_2^2} \quad (26)$$

Figure 16:
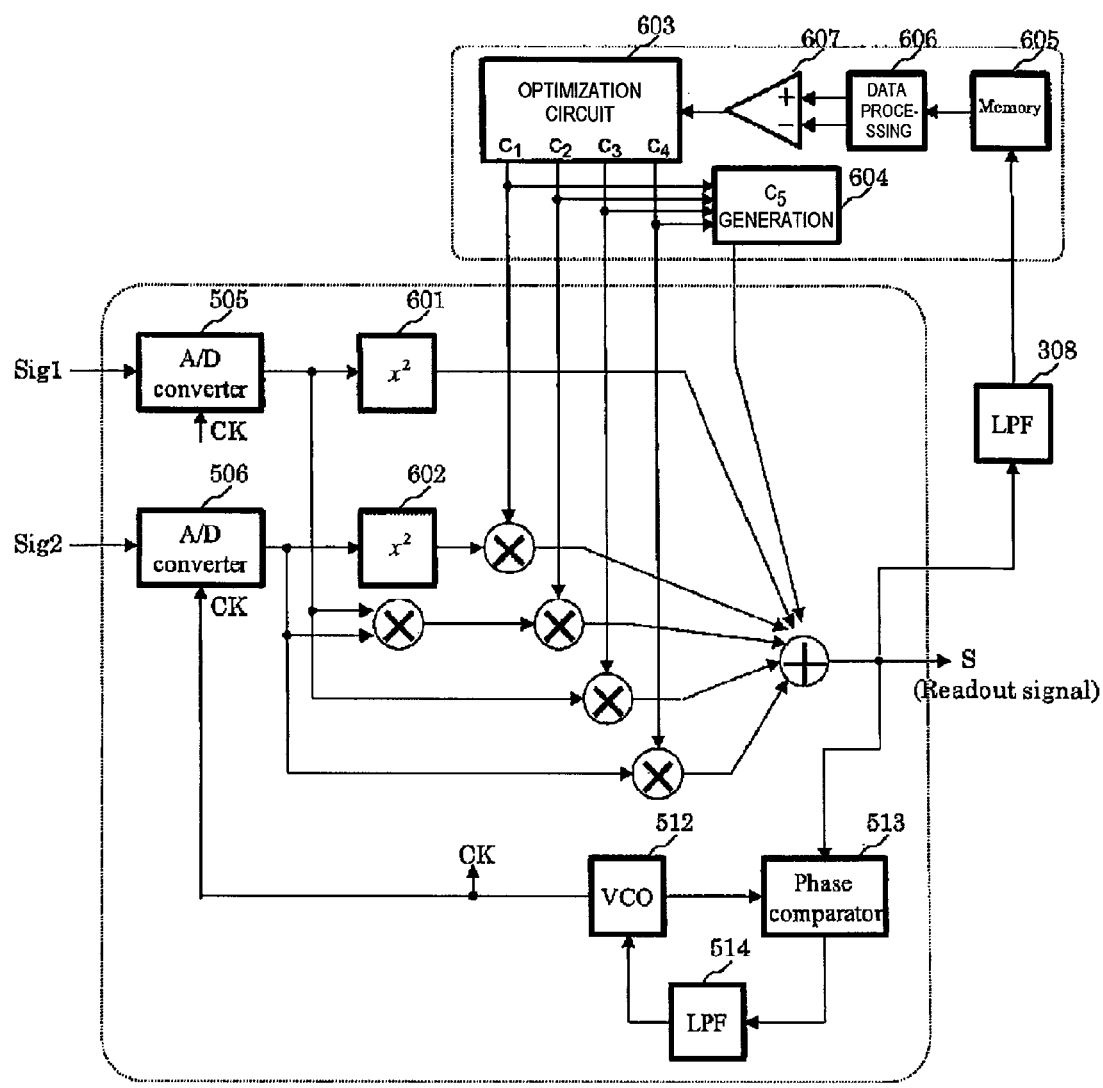
FIG. 16 is a diagram showing another configuration of the circuit block of the signal processing circuit.
Figure 17A:
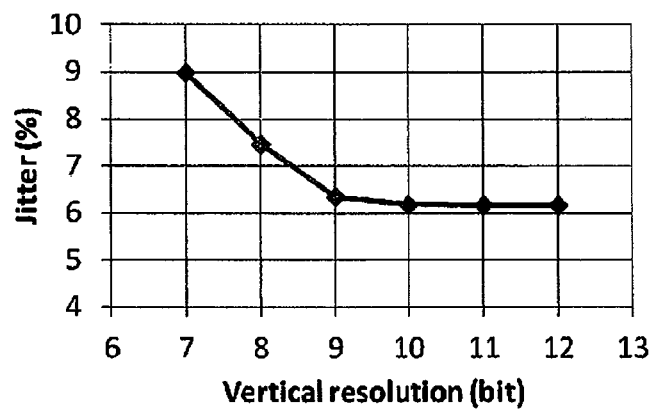
FIG. 17A is a graph showing a relationship between the vertical resolution and the jitter of the A/D converter in the Homodyne phase diversity detection.
Figure 17B:
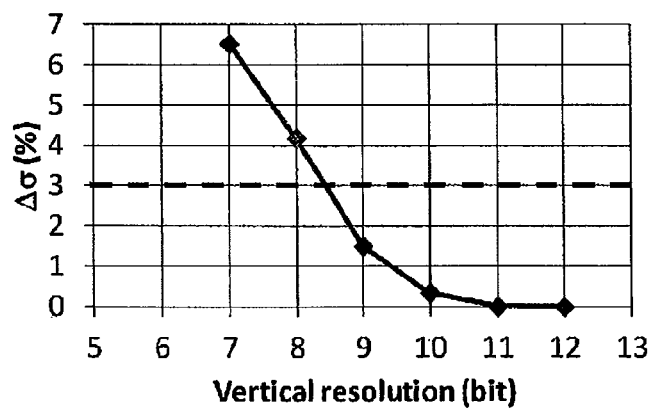
FIG. 17B is a graph showing a relationship between the vertical resolution and the jitter increment due to the influence of the quantization noise.

As a conclusion of the above, an optimum adjustment of the calculation is described as the block diagram shown in FIG. 16. Firstly, the input signals Sig1 and Sig2 are respectively digitalized by the A/D converters 505 and 506, then the square of Sig1, the square of Sig1 and Sig2, the product of Sig1 and Sig2 are generated using Sig1 and Sig2 thus digitalized, and squaring circuits 601, 602 and so on. Thus, the signal output S is generated together with the coefficients $c_1$, $c_2$, $c_3$, and $c_4$ provided from an optimization circuit 603, and the constant $c_5$. Here, the coefficient of the square term of Sig1 is fixed to 1, and the coefficient values $c_1$, $c_2$, $c_3$, and $c_4$ of the other terms except the constant term, and the constant $c_5$ are searched as parameters. The constant term $c_5$ is generated in a constant term generation circuit 604 from the search parameters $c_1$, $c_2$, $c_3$, and $c_4$ using the formula (26). The output signal S from which the reproduced signal component has been filtered out by a low-pass filter 308 is stored in a memory 605 for a certain period of time, and then a data processing circuit 606 generates the maximum value and the minimum value thereof, and then a differential circuit 607 outputs the difference between these values. It should be noted that the low-pass filter can be eliminated. The same applies to all of the low-pass filters described below. The output functions as a parameter for representing the level of the dependency on the interference phase, and the values of $c_1$, $c_2$, $c_3$, and $c_4$ are adjusted in the optimization circuit 603 so that this value is minimized. Since the optimized parameters are set to the values shown in the formula (25), the signal output S independent of the interference phase can be obtained. It should be noted that the parameters to be searched are not limited to the coefficient values described above, but it is also possible to set the values r, $b_1$, $b_2$, and $\sin\delta$ to the parameters to be searched, and to calculate the coefficients of the quadratic using the formula (25) based on these values.

It should be noted that the index of the dependency of the calculation output on the interference phase is not limited to the difference between the maximum value and the minimum value of the output described above. For example, the value obtained by normalizing this value with the amplitude of the reproduced signal or a DC component can be used instead.

After the calculation adjustment described above has been completed, the stable reproduced signal can be obtained using the fixed setting values. In other words, this means that after the adjustment is completed, it is not required to perform the adjustment when obtaining the reproduced signal. It should be noted that there is a possibility that the ideal setting values are shifted due to a temporary variation of the state of the apparatus, an environmental temperature variation, and so on, and thus the interference phase dependency gradually arises, and in such a case, it is required to perform the adjustment again at an appropriate timing. In the present embodiment, the parameter representing the level of the interference phase dependency is always monitored, and when the level exceeds a certain value, the calculation adjustment described above is started. It is also possible to arrange that the adjustment is performed at the time of startup of the apparatus, and periodically after predetermined period of time elapses from the latest adjustment besides the above timing.

Embodiment 8

Figure 13:
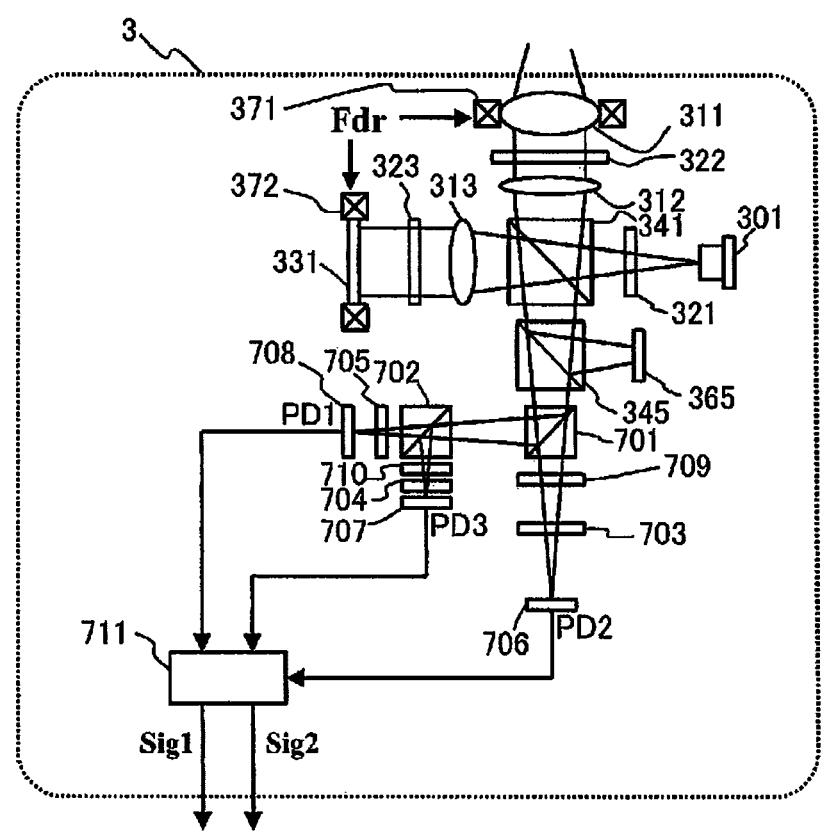
FIG. 13 is a diagram showing a configuration of another configuration of an optical head section.
Figure 14:
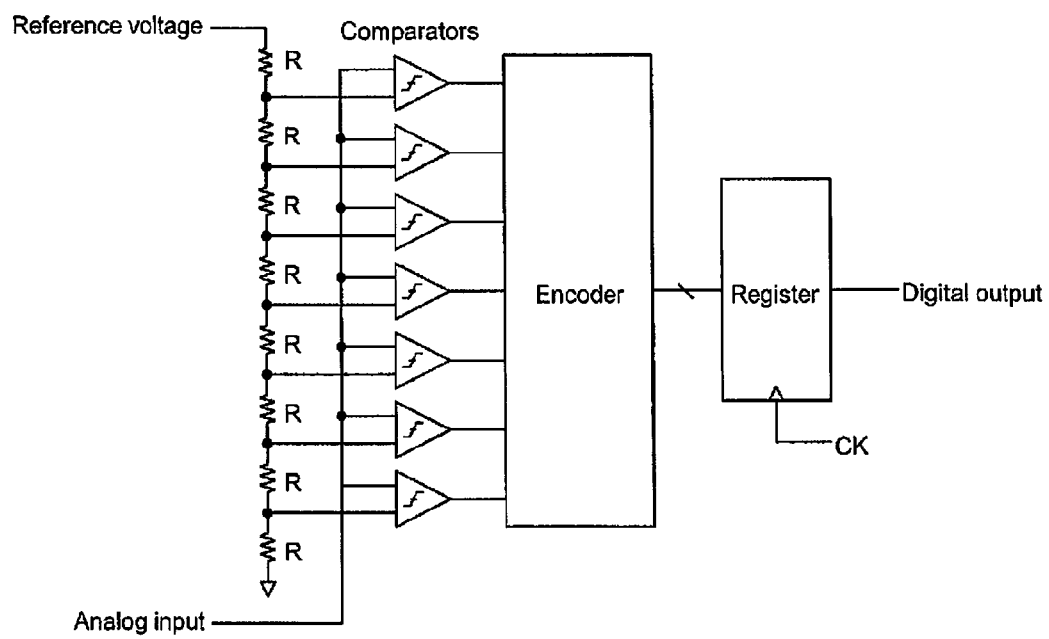
FIG. 14 is a block diagram showing a configuration of a flash type A/D converter.

The number of detectors and the phase difference between the signal light and the reference light on each of the detectors for obtaining the present advantage are not necessarily as described above. Here, an example in which the detection is performed using three detectors so that the phase difference between the signal light and the reference light on the detector is different between the detectors will be described. FIG. 13 shows a configuration of an optical head section in the case in which the three detectors are used, and the phase differences between the signal light and the reference light on the respective detectors are about 0 degree, about 120 degrees, and about 240 degrees. The light having passed through the collimator lens 312 is divided by non-polarized beam splitters 701, 702 into three light beams, which are transmitted through polarizing devices 703, 704, and 705 for transmitting 45-degree polarized light, and are then detected by the detectors 706, 707, and 708, respectively. Among the three light beams, one has a light path in which a phase plate 709 for generating the phase difference of 60 degrees between the signal light and the reference light is inserted, and another has a light path in which a phase plate 710 for generating the phase difference of 300 degrees between the signal light and the reference light is inserted. Further, in order to make the light intensities on the detectors equal to each other, the non-polarized beam splitter 701 having the ratio between the transmittance and the reflectance of 1 to 2, and the non-polarized beam splitter 702 having transmittance and the reflectance equal to each other are used. On this occasion, the intensities $I_{PD1}$, $I_{PD2}$, and $I_{PD3}$ of the incident lights on the respective detectors can be expressed as follows.

$$I_{PD1} = \left| \frac{1}{\sqrt{3}} E_{sig} - \frac{1}{\sqrt{3}} E_{ref} \right|^2 = \tag{27}$$
$$\frac{1}{3}|E_{sig}|^2 + \frac{1}{3}|E_{ref}|^2 - \frac{2}{3}|E_{sig}||E_{ref}|\cos(\varphi_{sig} - \varphi_{ref})$$

$$I_{PD2} = \left| \frac{1}{\sqrt{3}} E_{sig} + \frac{1}{\sqrt{3}} e^{\frac{\pi}{3}i} E_{ref} \right|^2 = \tag{28}$$
$$\frac{1}{3}|E_{sig}|^2 + \frac{1}{3}|E_{ref}|^2 + \frac{2}{3}|E_{sig}||E_{ref}|\cos\left(\varphi_{sig} - \varphi_{ref} - \frac{1}{3}\pi\right)$$

$$I_{PD3} = \left| \frac{1}{\sqrt{3}} E_{sig} + \frac{1}{\sqrt{3}} e^{\frac{\pi}{3}i} E_{ref} \right|^2 = \tag{29}$$
$$\frac{1}{3}|E_{sig}|^2 + \frac{1}{3}|E_{ref}|^2 + \frac{2}{3}|E_{sig}||E_{ref}|\cos\left(\varphi_{sig} - \varphi_{ref} + \frac{1}{3}\pi\right)$$

It should be noted that the fact that the phase difference of 180 degrees is generated between the signal light and the reference light when being reflected by the non-polarized beam splitters 701, 702 is considered. Then, these output signals are input to an arithmetic circuit 711 to thereby generate the following outputs Sig1 and Sig2.

$$Sig1 = I_{PD1} - \frac{I_{PD2} + I_{PD3}}{2} = |E_{sig}||E_{ref}|\cos(\varphi_{sig} - \varphi_{ref}) \tag{30}$$

$$Sig2 = \frac{\sqrt{3}}{2}(I_{PD2} - I_{PD3}) = |E_{sig}||E_{ref}|\sin(\varphi_{sig} - \varphi_{ref}) \tag{31}$$

Then, these outputs have the same configurations as those of the differential signals Sig1 and Sig2 in the example of the four detectors described above. Therefore, due to the calculation expressed by the following formula, the amplified signal independent of the phase difference between the signal light and the reference light can be obtained.

$$S = (Sig1)^2 + (Sig2)^2 = |E_{sig}|^2 |E_{ref}|^2 \tag{32}$$

In the case in which the optical system is not perfect, Sig1 and Sig2 have the configurations expressed by the formulas (18) and (19), and therefore, the same calculation and adjustment as in the example described above can be performed on these outputs.

Embodiment 9

Although in the embodiments described above, the signals are obtained by the square sum calculation from the signals of the three detectors or the four detectors, in the case in which a variation occurs in the original signals, the variation tends to be enlarged in general in the square sum calculation. In the case in which the light path length difference is varied, the reproduction output in each of the detectors varies as shown in FIG. 4. This phenomenon derives from the variation of the coefficient of the trigonometric function in the formulas (1) through (4), namely the interference state of the signal light and the reference light. However, if the signals are detected using the four detectors having the phase differences between the reference light and the signal light different by 90 degrees from each other as in the case of EMBODIMENT 1 and so on, a relatively large output signal can be obtained by either of the detectors. Therefore, in the present embodiment, there is adopted a method of obtaining the signal output by multiplying the differential calculation signals (Sig1, Sig2) of the formulas (5) and (6) by coefficients, and then adding the results to each other. Specifically, it is arranged that the reproduced signal is obtained by the formula (33). The coefficients α and β are obtained by the calculation of the formulas (34) and (35).

$$S = \alpha \cdot Sig1 + \beta \cdot Sig2 \tag{33}$$

$$\alpha = \frac{\overline{Sig1}}{\sqrt{\overline{Sig1}^2 + \overline{Sig2}^2}} \tag{34}$$

$$\beta = \frac{\overline{Sig2}}{\sqrt{\overline{Sig1}^2 + \overline{Sig2}^2}} \tag{35}$$

Here, the upper line represents the average value. In other words, the two differential outputs Sig1 and Sig2 shown in FIG. 4 are each averaged in a range from several tens of nanoseconds to several thousands of microseconds, then the coefficients are obtained by the formulas (34) and (35) using the averaged outputs and then set to the multiplier, and then the final signal output is obtained by the weighted sum calculation of the formula (33). The denominator of the formulas (34) and (35) are for normalizing the values to fulfill $\alpha^2 + \beta^2 = 1$. In principle (if no noise exists), the denominator always takes a constant value, and therefore, if the average value of Sig1 is simply defining as α, and the average value of Sig2 is simply defined as β instead of the formulas (34) and (35), substantially the same advantage can be obtained.

Figure 15A:
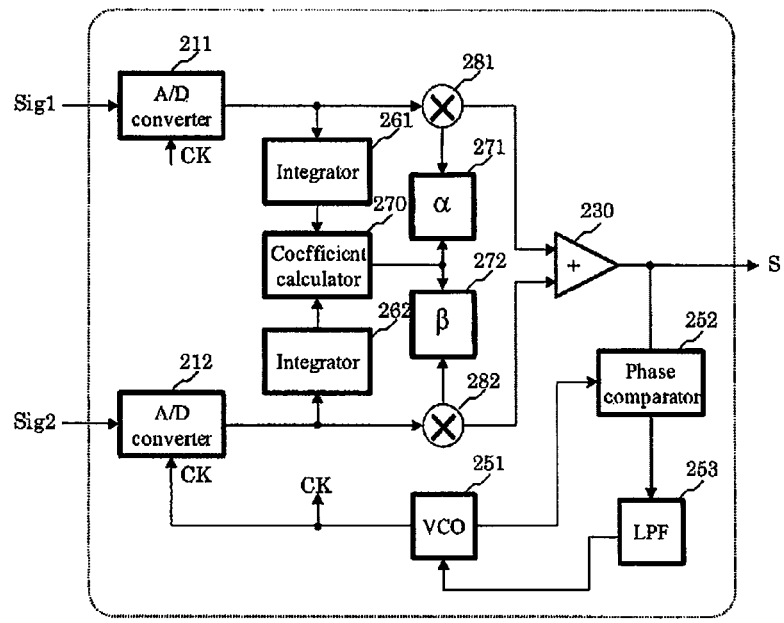
FIGS. 15A and 15B are diagrams each showing another configuration of the circuit block of the signal processing circuit.

FIG. 15A shows a block diagram of the signal processing section for realizing the signal processing of the present embodiment. The differential signals Sig1, Sig2 are digitalized by A/D converters 211, 212, respectively, and the digital outputs are input to two integrators 261, 262 to be averaged, respectively. A coefficient calculator block 270 calculates the coefficients α and β due to the formulas (34) and (35) using the values thus averaged by the integrators, and then sets the coefficients to coefficient holding circuits (registers) 271 and 272. Two digitalized signals multiplied by the coefficients using multiplier circuits 281 and 282, respectively, are added to each other by an adder 230, and thus, the digital signal output S compliant with the formula (33) can be obtained. The timing for the digitalization is obtained by the clock output (CK), on which the phase control is performed by a phase-locked loop (PLL) circuit including a phase comparator 252, a VCO 251, and an LPF 253, based on the output of the adder 230 similarly to the example shown in FIG. 5.

Here, the period for the average in the integrators 261, 262 is preferably set to be equal to or longer than a period several tens times as long as the signal acquisition period (the sampling interval) or the channel clock period. In the case of, for example, 100 times, the influence of the coefficient fluctuation due to the signal variation can be suppressed to $1/\sqrt{100}$, namely 1/10 compared to the case of the direct square sum calculation. It should be noted that it is necessary to vary the coefficients in accordance with the variation of the light path length. From the viewpoint of noise suppression, averaging is preferably performed for a long period of time. However, the phase difference between the signal light and the reference light varies in accordance with the displacement of the collecting lens (the objective lens) due to the focusing operation for following the vertical fluctuation of the optical information recording medium, and it is necessary to perform the follow-up control on α and β so that the α and β take the optimum values. For example, the double speed condition of the Blu-ray disc (BD) is assumed. Assuming that the disc has the surface fluctuation of about 0.2 mmpp, and the maximum acceleration of 5 m/s, the linear speed (BD2×) is 9.8 m/s at a position with a radius of 58 mm, the maximum surface fluctuation speed of 23 mm/s is obtained. This corresponds to the maximum phase change rate of 115,000*2π/s. Therefore, the shortest time necessary for the phase to vary by 90 degrees is 1/115,000/4=2 μs. This corresponds to a value roughly 250 times as long as the detection channel clock period. Therefore, by averaging the detector output for a shorter period of time (longer than a value roughly 100 times as long as the channel clock period) to obtain the optimum values of α and β, it is possible to follow the variation of the light path length, and at the same time sufficiently reduce the influence of the detection noise.

Figure 15B:
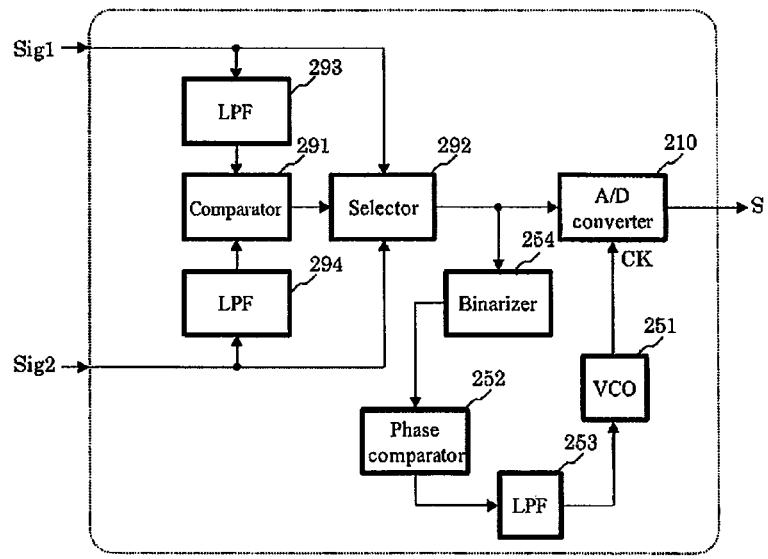

Although in the present embodiment the variable coefficients are obtained using the average outputs of the signals, the advantage of the invention can be obtained by performing a signal processing having a configuration of comparing the levels of the average outputs of Sig1 and Sig2 obtained by low-pass filters 293, 294, respectively, using a comparator 291, then selecting larger one of the signals by a selector 292 based on the comparison result, and then digitalizing the result by an A/D converter 210 as shown in FIG. 15B. On this occasion, although the signal output may decrease by 30% at most due to the variation of the light path length, a sufficiently significant signal increasing effect compared to the reproduction method of the related art can be obtained even in such a case, and therefore, the advantage of the invention can be obtained similarly to the embodiments described above.

Embodiment 10

Although in the optical head 3 of the embodiments described above the laser diode having a coherent length of 70 μm is used as the blue laser diode 301, it is possible to use a distributed feedback (DFB) laser diode instead thereof. The DFB laser has a feature of having a longer coherent length than that of the Fabry-Perot type laser. By using the DFB laser with the coherent length longer than about 1 mm, it is possible to always keep the difference in light path length between the signal light and the reference light sufficiently smaller than the coherent length without controlling the position of the reference light beam reflecting section 331 using the light path difference adjustment section 372, and therefore, the reference light and the signal light are always kept in a roughly perfectly coherent state. Therefore, in this case, since the light path difference adjustment section 372 is unnecessary, the configuration advantageous to miniaturization and price reduction of the optical head is obtained.

Although in the embodiments described the multilayer optical disc medium is cited as an application example of the optical information recording medium according to the invention, the invention is not limited thereto, but can also be applied to those having other configurations providing recording and reproduction of information are performed by being irradiated with light. For example, by applying the invention to a groove-less multilayer optical disc medium having a plurality of recording layers with no guide grooves and a guide layer dedicated to tracking servo having the guide grooves, a non-rotating card-type optical information recording medium, a tape-type optical information recording medium, and so on, substantially the same advantage can be obtained. Further, it is also possible to similarly apply the invention to a so-called volumetric recording medium having no recording layers in the medium but having sheet-like recording regions formed to have various depths from the surface of the medium, and thus, obtain the advantage of the invention.

Further, the Homodyne phase diversity detection denotes an optical signal detection method of obtaining the amplified reproduced signal by making the signal light reflected by the optical disc and the reference light branched from the same light source and guided to the detector without irradiating the optical disc interfere with each other, simultaneously obtaining, on this occasion, the detector outputs in a plurality of types of interference states having respective phase relationships between the reference light and the signal light shifted from each other, and then performing the calculation to thereby obtain the stable reproduced signal independent of the light path length variation due to the disc flapping. A representative configuration using the four detectors includes, for example, an optical head, a control section, and a signal processing section. The optical head includes a laser diode, a first optical element adapted to split a light beam from the laser diode into a first light beam and a second light beam, an objective lens adapted to collect the first light beam on a recording film surface of an optical information recording medium, and receive reflected light, a reference light beam reflecting section disposed in a light path of the second light beam, a first photodetector, a second photodetector, a third photodetector, a fourth photodetector, a second optical element adapted to split a light beam, which is obtained by combining the first light beam reflected by the optical information recording medium and the second light beam reflected by the reference light beam reflecting section, into light beams, and input the light beams respectively to the first photodetector and the second photodetector, a third optical element adapted to combine the first light beam reflected by the optical information recording medium and the second light beam reflected by the reference light beam reflecting section in a state having a phase relationship different by 90 degrees from the phase relationship of the combined light beam in the second optical element, split the light beam thus combined into light beams, and input the light beams respectively to the third photodetector and the fourth photodetector, and a housing adapted to hold the laser diode, the first optical element, the objective lens, the reference light beam reflecting section, the first photodetector, the second photodetector, the third photodetector, the fourth photodetector, the second optical element, and the third optical element. The control section controls positions of the optical head and the objective lens, and light emitting state of the laser diode. The signal processing section generates a reproduced signal from output signals from the first through fourth photodetectors. The phase relationship between the first light beam and the second light beam is different between the first photodetector and the second photodetector by about 180 degrees, different between the third photodetector and the fourth photodetector by about 180 degrees, and different between the first photodetector and the third photodetector by about 90 degrees. A first A/D converter adapted to convert a differential signal between the first photodetector and the second photodetector into a digital signal, and a second A/D converter adapted to convert a differential signal between the third photodetector and the fourth photodetector into a digital signal are included.

What is claimed is:

1. An optical information reproduction apparatus using Homodyne phase diversity detection comprising:
   a light source adapted to irradiate an optical information recording medium with light;
   a plurality of detectors adapted to detect a plurality of interference lights different from each other in a phase relationship between a signal light from the optical information recording medium and a reference light branched from the light source;
   a differential circuit adapted to generate a differential signal from the detectors; and
   an A/D converter having a vertical resolution of greater than or equal to 9 bits, and adapted to digitalize the differential signal,
   wherein the number of bits of the vertical resolution is determined based on a minimum modulation.

2. The optical information reproduction apparatus according to claim 1, wherein
   the number of bits of the vertical resolution fulfills the following denoting the number of bits with R, and the minimum modulation with $m_{min}$ $$R \geq 7 + \log_2\left(\frac{2\sqrt{2}}{1 - \sqrt{1 - m_{min}}}\right). \tag{12}$$

3. An optical information reproduction apparatus using Homodyne phase diversity detection comprising:
   a light source adapted to irradiate an optical information recording medium with light;
   a plurality of detectors adapted to detect a plurality of interference lights different from each other in a phase relationship between a signal light from the optical information recording medium and a reference light branched from the light source;
   a differential circuit adapted to generate a differential signal from the detectors;
   an A/D converter having a vertical resolution of greater than or equal to 9 bits, and adapted to digitalize the differential signal; and
   an absolute value calculator adapted to obtain an absolute value of the differential signal disposed between the differential circuit and the A/D converter.

4. The optical information reproduction apparatus according to claim 3, wherein
   the number of bits of the vertical resolution fulfills the following denoting the number of bits with R, and the minimum modulation with $m_{min}$ $$R \geq 7 + \log_2\left(\frac{2\sqrt{2}}{1 - \sqrt{1 - m_{min}}}\right) - 1. \tag{13}$$

5. The optical information reproduction apparatus according to claim 1, further comprising:
   a gain/offset adjustment circuit adapted to perform a gain adjustment and/or application of an offset on the differential signal disposed between the differential circuit and the A/D converter.

6. The optical information reproduction apparatus according to claim 1, further comprising:
   a gain/offset adjustment circuit adapted to perform a gain adjustment and/or application of an offset disposed in a posterior stage of the A/D converter.

7. An optical information reproduction apparatus using Homodyne phase diversity detection comprising:
   a light source adapted to irradiate an optical information recording medium with light;
   a plurality of detectors adapted to detect a plurality of interference lights different from each other in a phase relationship between a signal light from the optical information recording medium and a reference light branched from the light source;
   a differential circuit adapted to generate a differential signal from the detectors;
   an A/D converter having a vertical resolution of greater than or equal to 9 bits, and adapted to digitalize the differential signal; and
   an optimization circuit adapted to obtain coefficients of the following denoting the differential signals with Sig1, Sig2

$$Sig1^2 + r^2 Sig2^2 - 2rs \sin\delta Sig1 Sig2 + (-2b_1 + 2rs Sig2) Sig1 + \tag{25}$$
$$(2rsb_1 - 2r^2 b^2) Sig2 + (b_1^2 + r^2 b_2^2 - 2rs Sig1 Sig2) \equiv$$
$$Sig1^2 + c_1 Sig2^2 + c_2 Sig1 Sig2 + c_3 Sig1 + c_4 Sig2 + c_5.$$

8. The optical information reproduction apparatus according to claim 1, wherein
   the detector includes a first detector, a second detector, a third detector, and a fourth detector,
   the phase relationship between the signal light and the reference light is different between the first detector and the second detector by about 180 degrees, different between the third detector and the fourth detector by about 180 degrees, and different between the first detector and the third detector by about 90 degrees, and
   the A/D converter includes a first A/D converter adapted to convert a differential signal between the first detector and the second detector into a digital signal, and a second A/D converter adapted to convert a differential signal between the third detector and the fourth detector into a digital signal, and a vertical resolution of each of the first A/D converter and the second A/D converter is greater than or equal to 9 bits.

9. The optical information reproduction apparatus according to claim 1, wherein
   the detector includes a first detector, a second detector, and a third detector, and
   phase differences between the signal light and the reference light on the first detector, the second detector, and the third detector are about 0 degree, about 120 degrees, and about 240 degrees, respectively.

10. The optical information reproduction apparatus according to claim 1, further comprising:
    a squaring calculator and an adder adapted to calculate the differential signals Sig1, Sig2 as follows $$S = (Sig1)^2 + (Sig2)^2 = |E_{sig}|^2 |E_{ref}|^2 \tag{7}.$$

11. The optical information reproduction apparatus according to claim 1, further comprising:
    an arithmetic circuit adapted to calculate the differential signals Sig1, Sig2 as follows $$S = \alpha \cdot Sig1 + \beta \cdot Sig2 \tag{33}$$

$$\alpha = \frac{\overline{Sig1}}{\sqrt{\overline{Sig1}^2 + \overline{Sig2}^2}} \tag{34}$$

-continued $$\beta = \frac{\overline{Sig2}}{\sqrt{\overline{Sig1}^2 + \overline{Sig2}^2}}. \tag{35}$$

12. The optical information reproduction apparatus according to claim 1, wherein
the light source is a distributed feedback laser diode.

13. An optical information reproduction apparatus using Homodyne phase diversity detection comprising:
   a light source adapted to irradiate an optical information recording medium with light;
   a plurality of detectors adapted to detect a plurality of interference lights different from each other in a phase relationship between a signal light from the optical information recording medium and a reference light branched from the light source;
   a differential circuit adapted to generate a differential signal from the detectors;
   an absolute value calculator adapted to obtain an absolute value of the differential signal; and
   an A/D converter disposed in a posterior stage of the absolute value calculator.

* * * * *